United States Patent
Zeng et al.

(10) Patent No.: US 10,038,544 B2
(45) Date of Patent: Jul. 31, 2018

(54) MULTIPLE ACCESS FOR USERS WITH DIFFERENT MODES IN A COMMON UPLINK BURST IN A TIME DIVISION DUPLEX SUBFRAME STRUCTURE

(71) Applicant: QUALCOMM Incorporated, San Diego, CA (US)

(72) Inventors: Wei Zeng, San Diego, CA (US); Jing Jiang, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/185,315

(22) Filed: Jun. 17, 2016

(65) Prior Publication Data

US 2017/0170943 A1 Jun. 15, 2017

Related U.S. Application Data

(60) Provisional application No. 62/265,324, filed on Dec. 9, 2015.

(51) Int. Cl.
*H04L 5/14* (2006.01)
*H04L 5/00* (2006.01)
(Continued)

(52) U.S. Cl.
CPC ............ *H04L 5/14* (2013.01); *H04L 5/005* (2013.01); *H04L 5/0051* (2013.01);
(Continued)

(58) Field of Classification Search
CPC .......... B64C 2201/122; H04B 1/71072; H04J 11/0023; H04L 1/1812; H04L 5/001;
(Continued)

(56) References Cited

U.S. PATENT DOCUMENTS

2005/0036541 A1* 2/2005 McKown .......... H04L 25/03019
                                                          375/233
2006/0018279 A1* 1/2006 Agrawal .............. H04B 7/2656
                                                          370/330

(Continued)

FOREIGN PATENT DOCUMENTS

WO WO-2013060807 A2 5/2013
WO WO-2014008106 A1 1/2014

OTHER PUBLICATIONS

"5G Views on Technology & Standardization", 3GPP Draft, RWS-150012, QCOM-5G, 3rd Generation Partnership Project (3GPP), Mobile Competence Centre, 650, Route Des Lucioles, F-06921, Sophia, Antipolis Cedex, France, Sep. 2, 2015 (Sep. 2, 2015), XP051043597, Retrieved from the Internet: URL:http://www.3gpp.org/ftp/Meetings_3GPP_SYNC/WORKSHOP/Docs/.

(Continued)

*Primary Examiner* — Kashif Siddiqui
(74) *Attorney, Agent, or Firm* — Loza & Loza, LLP

(57) ABSTRACT

Various aspects of the present disclosure provide for methods, apparatus, and computer software for multiple access to a channel carrying a common uplink burst transmitted by users that utilize two different modes. Specifically, a coupled mode provides for range extension for users at a cell edge, while a decoupled mode provides for user data transmissions within the common uplink burst. Multiple access between these different modes may be provided in a non-orthogonal scheme by moderating the amount of interference between the respective modes. Further, multiple access between these different modes may be provided in an orthogonal scheme by utilizing interleaved frequency division multiple access (IFDMA).

18 Claims, 17 Drawing Sheets

(51) Int. Cl.
  *H04W 52/38* (2009.01)
  *H04W 72/04* (2009.01)
  *H04W 52/02* (2009.01)
  *H04B 1/7107* (2011.01)
  *H04J 11/00* (2006.01)
  *H04L 1/18* (2006.01)
  *H04B 7/0413* (2017.01)

(52) U.S. Cl.
  CPC ... *H04W 52/0216* (2013.01); *H04W 52/0219* (2013.01); *H04W 52/0245* (2013.01); *H04W 52/38* (2013.01); *H04W 72/0413* (2013.01); *H04W 72/0446* (2013.01); *B64C 2201/122* (2013.01); *H04B 1/71072* (2013.01); *H04B 7/0413* (2013.01); *H04J 11/0023* (2013.01); *H04L 1/1812* (2013.01); *H04L 5/001* (2013.01); *H04L 5/0016* (2013.01); *Y02D 70/00* (2018.01); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/22* (2018.01); *Y02D 70/26* (2018.01)

(58) Field of Classification Search
  CPC ..... H04L 5/0016; H04L 5/005; H04L 5/0051; H04L 5/14; H04W 52/0216; H04W 52/0219; H04W 52/0245; H04W 52/38; H04W 72/00
  See application file for complete search history.

(56) References Cited

U.S. PATENT DOCUMENTS

| | | | |
|---|---|---|---|
| 2006/0286995 A1* | 12/2006 | Onggosanusi | H04W 52/146 455/522 |
| 2007/0060161 A1* | 3/2007 | Chindapol | H04L 1/0001 455/450 |
| 2008/0037661 A1* | 2/2008 | Xun | H04L 1/0003 375/259 |
| 2008/0039129 A1* | 2/2008 | Li | H04L 1/0003 455/522 |
| 2013/0286902 A1* | 10/2013 | Chen | H04W 24/02 370/280 |
| 2013/0301545 A1* | 11/2013 | Wang | H04L 5/001 370/329 |
| 2015/0156786 A1* | 6/2015 | Kim | H04B 7/0452 370/329 |
| 2016/0270115 A1* | 9/2016 | Mukkavilli | H04W 72/1289 |
| 2017/0171856 A1* | 6/2017 | Zeng | H04W 72/0413 |
| 2017/0223671 A1* | 8/2017 | He | H04W 72/042 |

OTHER PUBLICATIONS

International Search Report and Written Opinion—PCT/US2016/064840—ISA/EPO—dated Mar. 2, 2017.

QUALCOMM Incorporated: "On Physical Layer Aspects of Low Latency Operation", 3GPP Draft; R1-157082, on Physical Layer Aspects of Low Latency Operation, 3rd Generation Partnership Project (3GPP), Mobile Competence Centre; 650, Route Des Lucioles; F-06921 Sophia-Antipolis Cedex; vol. RAN WG1, No. Anaheim, California, USA; Nov. 16, 2015-Nov. 20, 2015, Nov. 7, 2015 (Nov. 7, 2015), pp. 1-4, XP051022666, Retrieved from the Internet: URL: http://www.3gpp.org/ftp/tsg_ran/WG1_RL1/TSGR1_83/Docs/ [retrieved on Nov. 7, 2015].

* cited by examiner

US 10,038,544 B2

MULTIPLE ACCESS FOR USERS WITH DIFFERENT MODES IN A COMMON UPLINK BURST IN A TIME DIVISION DUPLEX SUBFRAME STRUCTURE

PRIORITY CLAIM

This application claims priority to and the benefit of provisional patent application No. 62/265,324 filed in the United States Patent and Trademark Office on Dec. 9, 2015, the entire content of which is incorporated herein by reference as if fully set forth below in its entirety and for all applicable purposes.

TECHNICAL FIELD

Aspects of the present disclosure relate generally to wireless communication systems, and more particularly, to the uplink channel structure for multiple access of users with different modes in a time division duplex (TDD) subframe.

INTRODUCTION

Wireless communication networks are widely deployed to provide various communication services such as telephony, video, data, messaging, broadcasts, and so on. Such networks, which are usually multiple access networks, support communications for multiple users by sharing the available network resources.

Within such wireless networks a variety of data services may be provided, including voice, video, emails, and others. More recently, wireless communication networks are being utilized for an even broader range of services, including mission critical applications and remote control applications such as tele-surgery, where real-time feedback is necessary. In such applications, very low latency is critical to enable a suitably high quality of service. That is, the time for information to be transmitted from a communication device, and a response received back at the communication device, may need to be extremely rapid, on the order of milliseconds or less.

As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for methods, apparatus, and computer software for wireless communication utilizing a common uplink burst, wherein multiple access for the common uplink burst is achieved for devices configured for a coupled mode, and devices configured for a decoupled mode.

One aspect of the disclosure provides a method operable at a scheduling entity for wireless communication over a time division duplex (TDD) carrier. According to the method, a scheduling entity receives a first uplink burst from a coupled mode user within each of a downlink-centric subframe and an uplink-centric subframe on the TDD carrier, and the scheduling entity receives a second uplink burst, simultaneously with the first uplink burst, from a decoupled mode user within each of the downlink-centric subframe and the uplink-centric subframe on the TDD carrier. The first uplink burst from the coupled mode user is combined with the second uplink burst from the decoupled mode user on the TDD carrier utilizing non-orthogonal multiple access.

Another aspect of the disclosure provides a method operable at a scheduling entity for wireless communication over a TDD carrier. According to the method, a scheduling entity receives a first uplink burst from a coupled mode user within each of a downlink-centric subframe and an uplink-centric subframe on the TDD carrier, and the scheduling entity receives a second uplink burst, simultaneously with the first uplink burst, from a decoupled mode user within each of the downlink-centric subframe and the uplink-centric subframe on the TDD carrier. The first uplink burst from the coupled mode user is combined with the second uplink burst from the decoupled mode user on the TDD carrier utilizing orthogonal multiple access.

Another aspect of the disclosure provides a scheduling entity configured for wireless communication over a TDD carrier. The scheduling entity includes a processor, a memory communicatively coupled to the processor, and a transceiver communicatively coupled to the processor. The processor and the memory are configured to receive a first uplink burst from a coupled mode user within each of a downlink-centric subframe and an uplink-centric subframe on the TDD carrier. The processor and the memory are further configured to receive a second uplink burst, simultaneously with the first uplink burst, from a decoupled mode user within each of the downlink-centric subframe and the uplink-centric subframe on the TDD carrier. The first uplink burst from the coupled mode user is combined with the second uplink burst from the decoupled mode user on the TDD carrier utilizing non-orthogonal multiple access.

Another aspect of the disclosure provides a scheduling entity configured for wireless communication over a TDD carrier. The scheduling entity includes a processor, a memory communicatively coupled to the processor, and a transceiver communicatively coupled to the processor. The processor and the memory are configured to receive a first uplink burst from a coupled mode user within each of a downlink-centric subframe and an uplink-centric subframe on the TDD carrier. The processor and the memory are further configured to receive a second uplink burst, simultaneously with the first uplink burst, from a decoupled mode user within each of the downlink-centric subframe and the uplink-centric subframe on the TDD carrier. The first uplink burst from the coupled mode user is combined with the second uplink burst from the decoupled mode user on the TDD carrier utilizing orthogonal multiple access.

Another aspect of the disclosure provides a scheduling entity for wireless communication over a TDD carrier. The scheduling entity includes means for receiving a first uplink burst from a coupled mode user within each of a downlink-centric subframe and an uplink-centric subframe on the TDD carrier. The scheduling entity further includes means for receiving a second uplink burst, simultaneously with the first uplink burst, from a decoupled mode user within each of the downlink-centric subframe and the uplink-centric subframe on the TDD carrier. The first uplink burst from the coupled mode user is combined with the second uplink burst from the decoupled mode user on the TDD carrier utilizing non-orthogonal multiple access.

Another aspect of the disclosure provides a scheduling entity for wireless communication over a TDD carrier. The scheduling entity includes means for receiving a first uplink burst from a coupled mode user within each of a downlink-centric subframe and an uplink-centric subframe on the TDD carrier. The scheduling entity further includes means for receiving a second uplink burst, simultaneously with the first uplink burst, from a decoupled mode user within each of the downlink-centric subframe and the uplink-centric subframe on the TDD carrier. The first uplink burst from the coupled mode user is combined with the second uplink burst from the decoupled mode user on the TDD carrier utilizing orthogonal multiple access.

Another aspect of the disclosure provides a computer-readable storage medium including code executable by a scheduling entity for wireless communication over a TDD carrier. The code includes receiving a first uplink burst from a coupled mode user within each of a downlink-centric subframe and an uplink-centric subframe on the TDD carrier. The code further includes receiving a second uplink burst, simultaneously with the first uplink burst, from a decoupled mode user within each of the downlink-centric subframe and the uplink-centric subframe on the TDD carrier. The first uplink burst from the coupled mode user is combined with the second uplink burst from the decoupled mode user on the TDD carrier utilizing non-orthogonal multiple access.

Another aspect of the disclosure provides a computer-readable storage medium including code executable by a scheduling entity for wireless communication over a TDD carrier. The code includes receiving a first uplink burst from a coupled mode user within each of a downlink-centric subframe and an uplink-centric subframe on the TDD carrier. The code further includes receiving a second uplink burst, simultaneously with the first uplink burst, from a decoupled mode user within each of the downlink-centric subframe and the uplink-centric subframe on the TDD carrier. The first uplink burst from the coupled mode user is combined with the second uplink burst from the decoupled mode user on the TDD carrier utilizing orthogonal multiple access.

Another aspect of the disclosure provides a method operable at a coupled mode subordinate entity for wireless communication over a TDD carrier. According to the method, a coupled mode subordinate entity prepares a first uplink burst including a sounding reference signal (SRS) in a first symbol and control information in a second symbol configured to be demodulated based on the SRS. The coupled mode subordinate entity transmits the first uplink burst within a subframe on the TDD carrier. The first uplink burst is combined with a second uplink burst transmitted, simultaneously with the first uplink burst, from a decoupled mode subordinate entity on the TDD carrier utilizing non-orthogonal multiple access.

Another aspect of the disclosure provides a method operable at a coupled mode subordinate entity for wireless communication over a TDD carrier. According to the method, a coupled mode subordinate entity prepares a first uplink burst including a sounding reference signal (SRS) in a first symbol and control information in a second symbol configured to be demodulated based on the SRS. The coupled mode subordinate entity transmits the first uplink burst within a subframe on the TDD carrier. The first uplink burst is combined with a second uplink burst transmitted, simultaneously with the first uplink burst, from a decoupled mode subordinate entity on the TDD carrier utilizing orthogonal multiple access.

Another aspect of the disclosure provides a method operable at a decoupled mode subordinate entity for wireless communication over a TDD carrier. According to the method, a decoupled mode subordinate entity prepares a first uplink burst including a sounding reference signal (SRS) in a first symbol and a demodulation reference signal (DM-RS) in a second symbol decoupled from the SRS. The decoupled mode subordinate entity transmits the first uplink burst within a subframe on the TDD carrier. The first uplink burst is combined with a second uplink burst transmitted, simultaneously with the first uplink burst, from a coupled mode subordinate entity on the TDD carrier utilizing non-orthogonal multiple access.

Another aspect of the disclosure provides a method operable at a decoupled mode subordinate entity for wireless communication over a TDD carrier. According to the method, a decoupled mode subordinate entity prepares a first uplink burst including a sounding reference signal (SRS) in a first symbol and a demodulation reference signal (DM-RS) in a second symbol decoupled from the SRS. The decoupled mode subordinate entity transmits the first uplink burst within a subframe on the TDD carrier. The first uplink burst is combined with a second uplink burst transmitted, simultaneously with the first uplink burst, from a coupled mode subordinate entity on the TDD carrier utilizing orthogonal multiple access.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
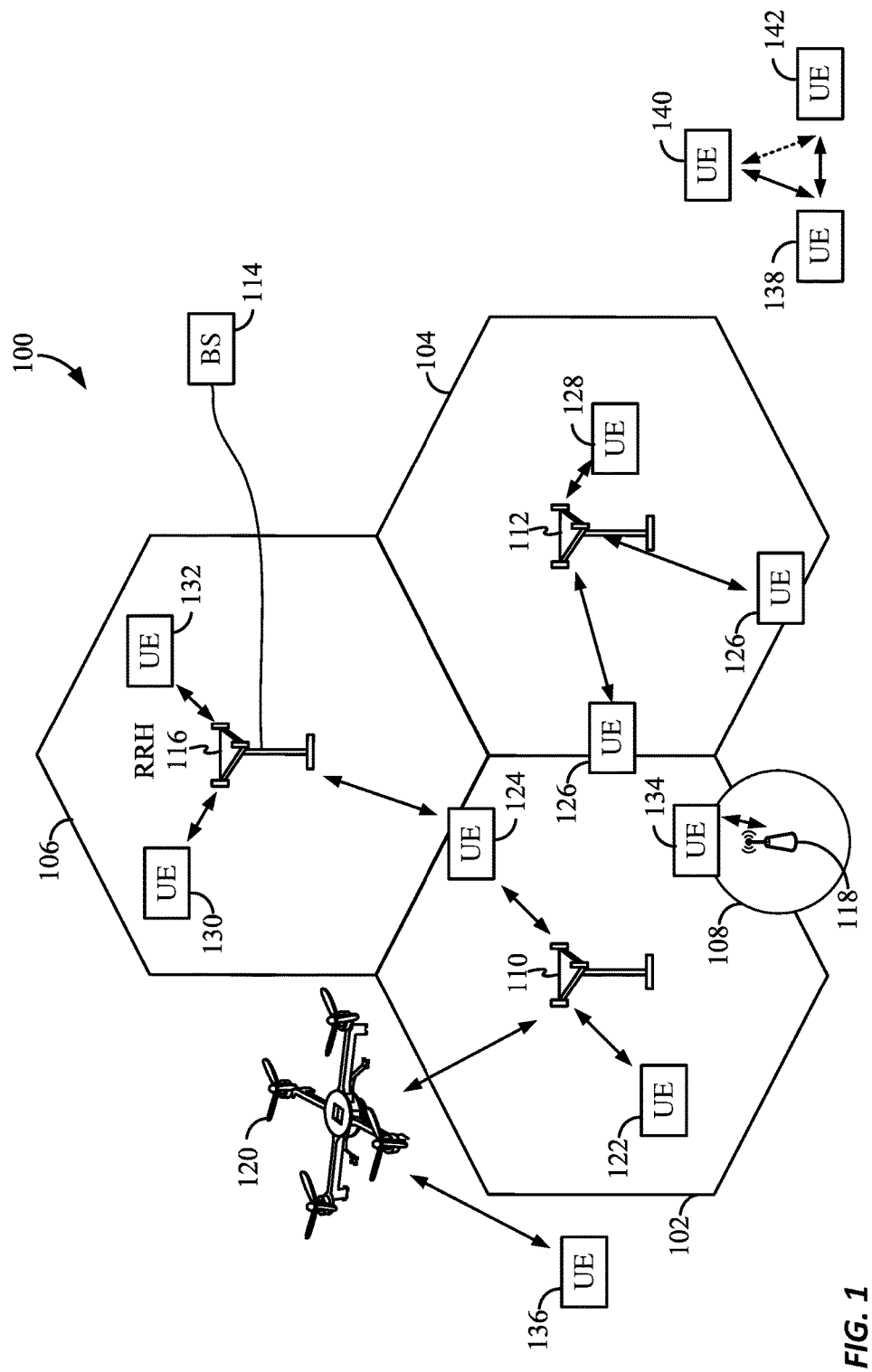
FIG. 1 is a schematic diagram of a wireless communication network according to some embodiments of the present disclosure.

FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity (e.g., a UE 138).

Figure 2:
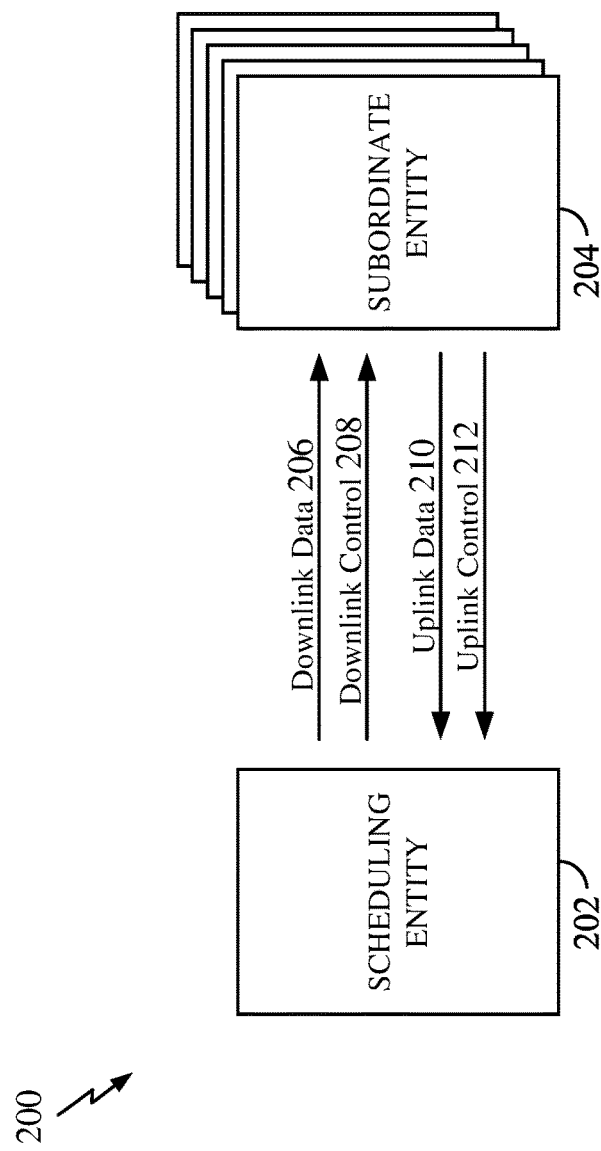
FIG. 2 is a schematic block diagram illustrating a scheduling entity in communication with a plurality of subordinate entities according to some embodiments of the present disclosure.

Thus, in a wireless communication network with a scheduled access to time—frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202. A subordinate entity may be, or may reside within, a base station, a network node, a UE, an access terminal, or any suitable node in a wireless communication network.

Figure 3:
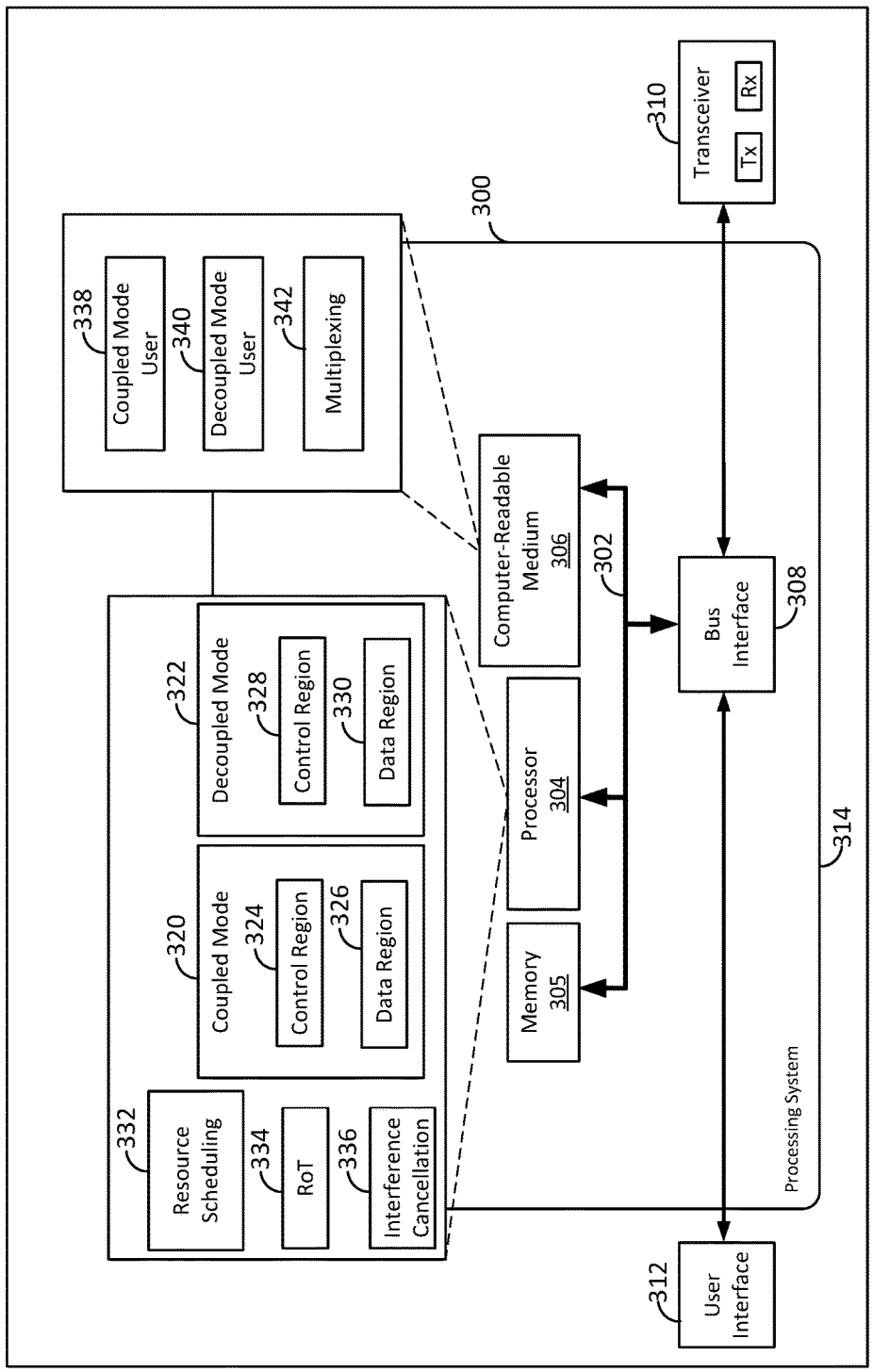
FIG. 3 is a block diagram illustrating an example of a wireless communication device according to some embodiments of the present disclosure.

FIG. 3 is a conceptual diagram illustrating an example of a hardware implementation for a wireless communication device 300 employing a processing system 314. In accordance with various aspects of the disclosure, an element, or any portion of an element, or any combination of elements may be implemented with a processing system 314 that includes one or more processors 304. For example, the wireless communication device 300 may be a scheduling entity 202, base station (BS), or any other suitable network node, as illustrated in FIGS. 1, 2, and/or 4. Furthermore, the wireless communication device 300 may be a subordinate entity 204, a UE, an IoE device, or any other suitable network node, as illustrated in FIGS. 1, 2, and/or 4. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a wireless communication device 300, may be used to implement any one or more of the processes described in FIGS. 10-13 of the present disclosure.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and one or more transceivers 310. The transceiver 310 (a communication interface) provides means for communicating with various other apparatus over a transmission medium. In various examples, the transceivers 310 may include one or more antennas, and in multi-antenna examples, may be enabled to determine an angle from which a received signal arrives, or for beamforming of transmitted signals. The transceiver 310 may include various sub-components configured to enable wireless communication, including but not limited to one or more power amplifiers, a transmitter, a receiver, filters, oscillators, etc. Further, depending upon the nature of the apparatus, a user interface 312 (e.g., keypad, display, speaker, microphone, joystick, etc.) may also be provided.

In one aspect of the disclosure, the processor 304 includes a coupled mode user control block 320 and a decoupled mode user control block 322. The coupled mode user control block may be configured to perform various functions for coupled mode communication, and the decoupled mode user control block may be configured to perform various functions for decoupled mode communication, as described in relation to FIGS. 5-13. In one example, the coupled mode user control block 320 may include a control region block 324 and a data region block 326. Similarly, the decoupled mode user control block 322 includes a control region block 328 and a data region block 330. The control region blocks 324 and 328 may be configured to perform functions related to communication in control regions 510 and 514 (see FIG. 5) of a subframe, and the data region blocks 326 and 330 may be configured to perform functions related to communication in data regions 512 and 516 (see FIG. 5) of a subframe.

In one aspect of the disclosure, the processor 304 includes a resource scheduling block 332 that may be configured to schedule, allocate, and/or assign resources for coupled mode users and decoupled mode users in communication with the apparatus 300 as described in relation to FIGS. 5-13. For example, the resource scheduling block 332 may be utilized to schedule traffic such that a first uplink burst from a coupled mode user may be combined with a second uplink burst from a decoupled mode user on a time division duplex (TDD) carrier utilizing non-orthogonal multiple access or orthogonal multiple access as shown in FIGS. 5-8.

The processor 304 may further include a rise over thermal (RoT) block 334 and an interference cancellation block 336. The RoT block 334 may be configured to perform various functions to control RoT as described in FIG. 12, for example. The interference cancellation block 336 may be configured to perform various interference cancellation functions described in FIG. 11, for example.

The processor 304 is responsible for managing the bus 302 and general processing, including the execution of software stored on the computer-readable medium 306. The software, when executed by the processor 304, causes the processing system 314 to perform the various functions described below in relation to FIGS. 5-13 for any particular apparatus. The computer-readable medium 306 may also be used for storing data that is manipulated by the processor 304 when executing software.

In one aspect of the disclosure, the software includes computer executable code or instructions for configuring the processor 304 and/or the apparatus 300 to perform the various functions described in FIGS. 5-13. For example, the software may include coupled mode user control code 338, decoupled mode user control code 340, and multiplexing control code 342. The coupled mode user code 338 when executed configures the processor 304 to perform various functions related to coupled mode users as described in FIGS. 5-13. The decoupled mode user code 340 when executed configures the processor 304 to perform various functions related to decoupled mode users as described in FIGS. 5-13. The multiplexing control code 342 when executed configures the processor 304 to perform various functions related to multiplexing coupled mode user traffic and decoupled mode user traffic as described in FIGS. 5-13.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
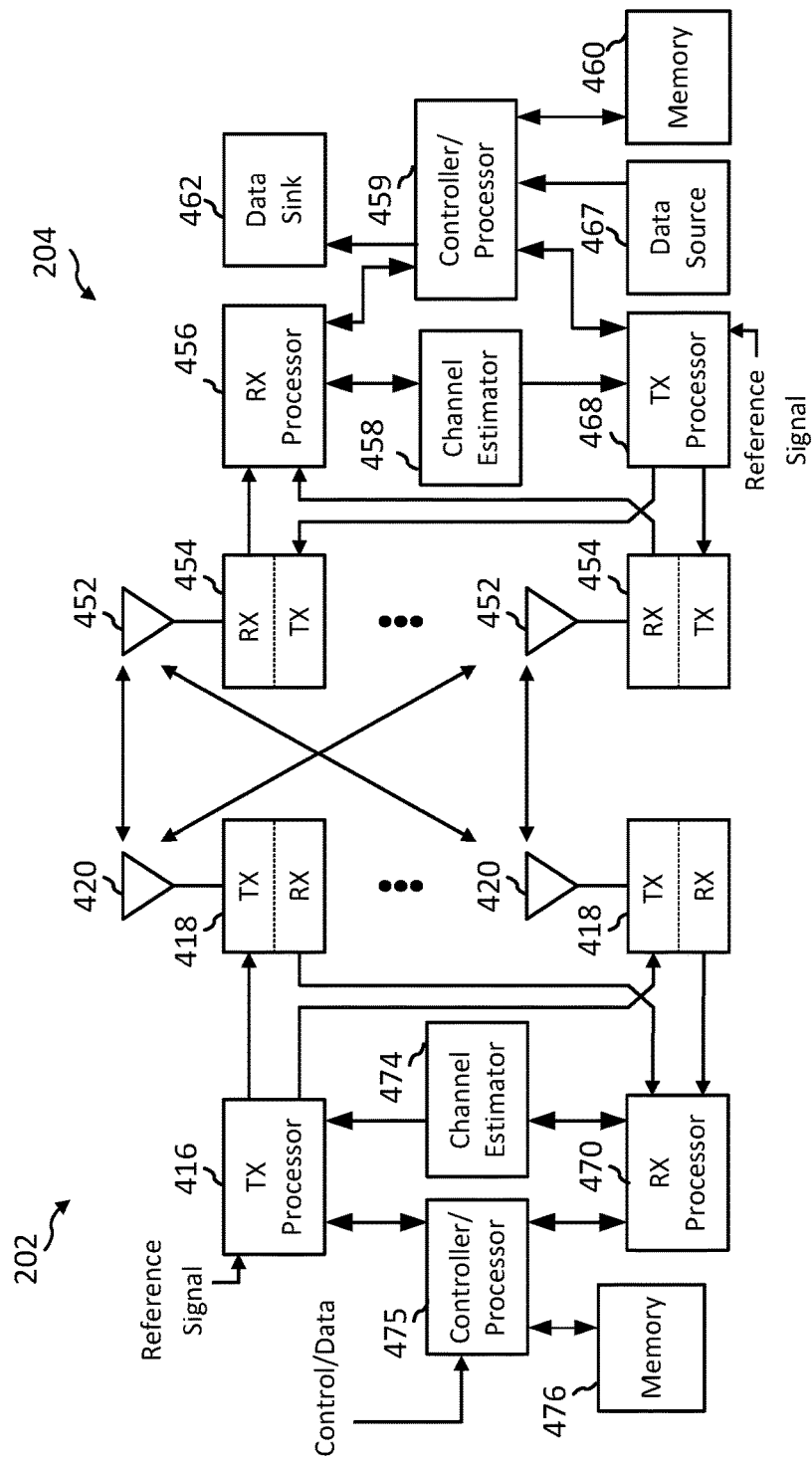
FIG. 4 is a block diagram illustrating further detail of a scheduling entity in communication with a subordinate entity according to some embodiments of the present disclosure.

FIG. 4 is a block diagram showing additional details of one example of a scheduling entity 202 in communication with one example of a subordinate entity 204 in an access network. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the subordinate entity 204 based on various priority metrics. The controller/processor 475 is also responsible for hybrid automatic repeat request (HARQ) operations, retransmission of lost packets, and signaling to the subordinate entity 204.

The transmit (TX) processor 416 implements various signal processing functions for the L1 layer (i.e., physical layer). The signal processing functions include coding and interleaving to facilitate forward error correction (FEC) at the subordinate entity 204 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), etc.). The coded and modulated symbols are then split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams Channel estimates from a channel estimator 474 may be used to determine the coding and modulation scheme, as well as for spatial processing. The channel estimate may be derived from a reference signal and/or channel condition feedback transmitted by the subordinate entity 204. Each spatial stream may then be provided to a different antenna 420 via a separate transmitter 418TX. Each transmitter 418TX may modulate an RF carrier with a respective spatial stream for transmission.

At the subordinate entity 204, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 may perform spatial processing on the information to recover any spatial streams destined for the subordinate entity 204. If multiple spatial streams are destined for the subordinate entity 204, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the scheduling entity 202. These soft decisions may be based on channel estimates computed by the channel estimator 458. The soft decisions are then decoded and deinterleaved to recover the data and control signals that were originally transmitted by the scheduling entity 20 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the scheduling entity 202, the controller/processor 459 implements the L2 layer for the user plane and the control plane by providing header compression, ciphering, packet segmentation and reordering, and multiplexing between logical and transport channels based on radio resource allocations by the scheduling entity 202. The controller/processor 459 is also responsible for HARQ operations, retransmission of lost packets, and signaling to the scheduling entity 202.

Channel estimates derived by a channel estimator 458 from a reference signal or feedback transmitted by the scheduling entity 202 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission. In some examples, in the UL and DL directions, all or part of the transmission may utilize a single-carrier waveform, an OFDM waveform, and any waveforms or modulation schemes described in this disclosure in relation to an UL burst.

The UL transmission is processed at the scheduling entity 202 in a manner similar to that described in connection with the receiver function at the subordinate entity 204. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the subordinate entity 204. Upper layer packets from the controller/processor 475 may be provided to the core network. The controller/processor 475 is also responsible for error detection using an ACK and/or NACK protocol to support HARQ operations.

In one aspect of the disclosure, the above-described various components and functional blocks of a scheduling entity 202 in FIG. 4 may be included in the apparatus 300. In another aspect of the disclosure, the above described various components and functional blocks of a subordinate entity 204 in FIG. 4 may be included in the apparatus 300.

In any wireless communication network, bi-directional communication is a desirable feature. Frequently, duplexing communication onto the air channel is accomplished utilizing frequency division duplex (FDD) or time division duplex (TDD). In FDD, a pair of carriers is used, with each respective carrier being used to carry communication signals in a different direction. In TDD, unpaired carriers are used. Here, duplexing of uplink and downlink communication is achieved by time sharing the carrier, with uplink and downlink communication occupying the carrier at different times.

In many modern wireless communication networks, significant portions of the spectrum have been allocated by regulatory agencies in paired carriers for FDD. For new developing technologies, if very high bandwidth communication is desired (e.g., 100 MHz, 300 Mhz, or more), however, these FDD technologies already utilize much of the spectrum, and may not be as wideband as desired for much higher data rates. At higher frequencies, including but not limited to millimeter wave (mmW) frequencies, TDD carriers may be more available. Furthermore, such TDD carriers may be less expensive for a carrier to obtain rights to use.

Common UL Burst in a TDD Carrier

When utilizing a TDD carrier, communication may in some examples be organized by dividing the channel in the time domain into frames, with frames being further divided into subframes. According to an aspect of the present disclosure, subframes may take at least two general forms, referred to herein as an uplink-centric subframe structure and a downlink-centric subframe structure. Here, a downlink-centric subframe is a subframe where a majority of its time is used for communication in the downlink direction; and an uplink-centric subframe is a subframe where a majority of its time is used for communication in the uplink direction.

Figure 5:
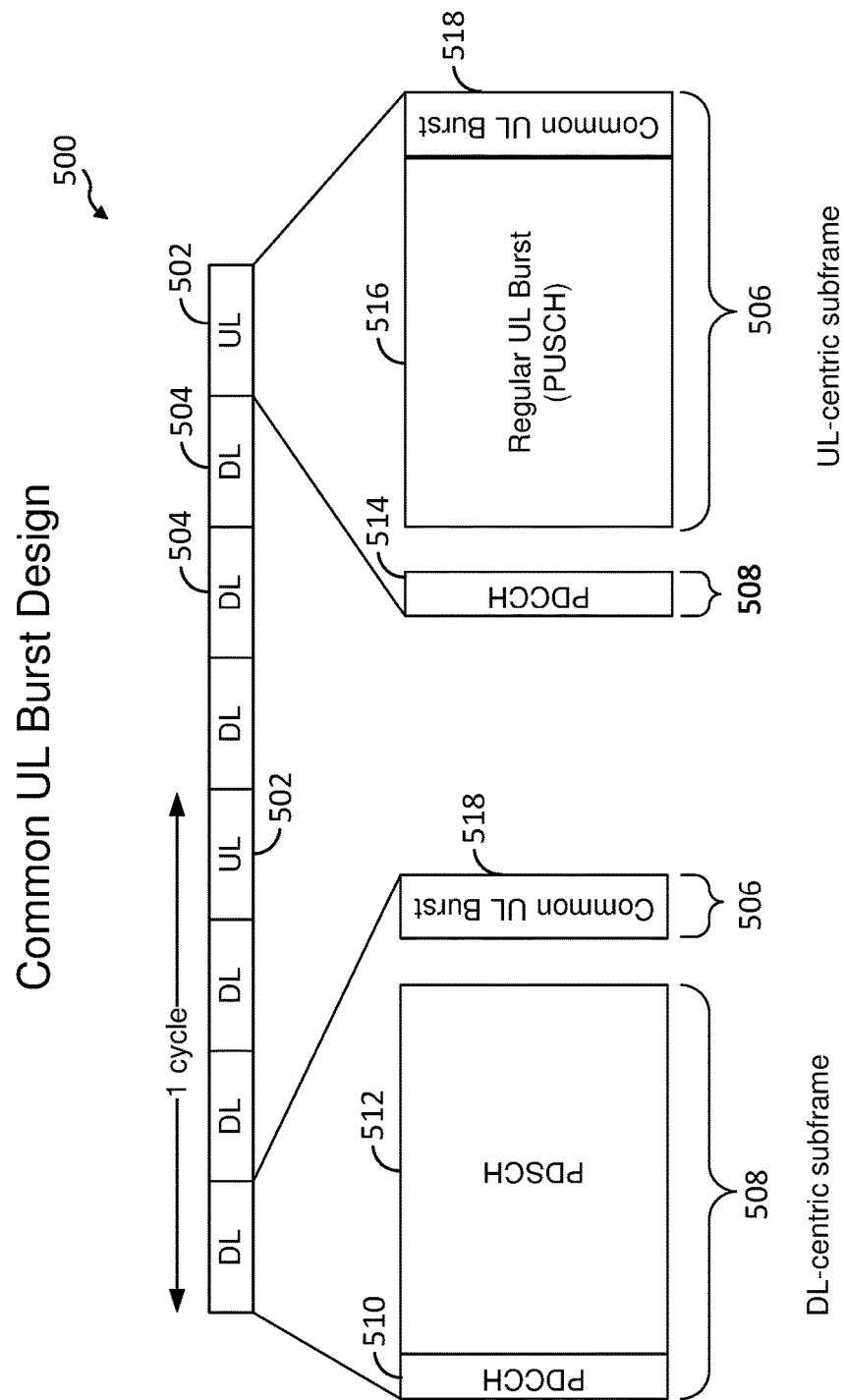
FIG. 5 is a schematic diagram illustrating a downlink-centric subframe and an uplink-centric subframe each including a common uplink burst according to some embodiments of the present disclosure.

FIG. 5 is a schematic illustration showing a set of subframes 500 (e.g., a frame) including one uplink-centric subframe 502 in every four subframes in one cycle, with the remaining three out of four subframes being downlink-centric subframes 504. Of course, this particular allocation of uplink-to-downlink centric subframes is merely one example, and any proportion of uplink and downlink centric subframes may be utilized in a particular implementation. In one example, a frame may have more uplink-centric subframes 502 than downlink-centric subframes 504. In another example, a frame may have more downlink-centric subframes 504 than uplink-centric subframes 502. In still another example, a frame may have equal numbers of uplink-centric subframes 502 and downlink-centric subframes 504.

In the illustrated examples, each subframe includes an uplink portion 506 utilized for uplink communication and a downlink portion 508 utilized for downlink communication. Here, a gap, a guard period, a guard interval, or a guard region may be utilized after a downlink portion and before an uplink portion. Such a gap may facilitate switching of the RF components of the transmitter and/or receiver, including re-tuning a phase-lock loop and other radio functions/circuitry.

The illustrated downlink-centric subframe 504 includes a control region 510, which may include a physical downlink control channel (PDCCH), and a data region 512, which may include a physical downlink shared channel (PDSCH). The control region 510 may include, among other things, scheduling information for informing scheduled devices (e.g., a UE) which resources in the data region 512 include information for that particular device.

The illustrated uplink-centric subframe 502 also includes a control region 514, which may include a PDCCH, and a data region 516, which may include a physical uplink shared channel (PUSCH) and/or other suitable channels corresponding to a regular uplink data burst. The control region may include, among other things, scheduling information for informing scheduled devices (e.g., a UE) which resources they may utilize for uplink transmissions in the data region 516.

As illustrated in this example, both the uplink-centric subframe 502 and the downlink-centric subframe 504 include a common uplink burst portion 518. In this example, the common UL burst portion 518 is shown at the end of each subframe, but it is not necessarily limited to the end, and in other examples the common UL burst may appear at any suitable time within an uplink-centric subframe or a downlink-centric subframe, including at the beginning of the subframe, or anywhere within the subframe. In some examples, the common UL burst 518 may be structured in the same way in both the uplink-centric subframes 502 and in the downlink-centric subframes 504.

In an aspect of the disclosure, the common UL burst 518 may be a relatively short portion of the respective subframe, including, for example, two symbols. For example, a two-symbol common UL burst may have a duration of around 31 μs. Of course, different durations, and different numbers of symbols may be included in the common UL burst within the scope of the present disclosure. That is, in a common UL burst within the scope of the present disclosure, any suitable number of symbols may be utilized. However, for clarity, within the present disclosure, a common UL burst including two symbols is described in further detail, for example, in FIGS. 6 and 8.

Here, the common UL burst may be utilized to decouple the latency associated with a control channel carried in the common UL burst, from the uplink/downlink pattern selected in any given implementation. This decoupling is provided because a common UL burst is present in both uplink-centric and downlink-centric subframes. For example, in a TDD scheme, the downlink-centric subframes may typically appear much more frequently than the uplink-centric subframes, since more regular network traffic may typically be in the downlink direction. Further, in a typical deployment of a macrocell (e.g., an eNode B in an LTE deployment), the ratio between uplink and downlink traffic remains relatively stable over time. That is, even though any single user's UL/DL ratio may change rather drastically, when aggregated over large numbers of users, the overall ratio generally remains nearly the same. However, unlike a macrocell small cells may only serve very small numbers of users. Thus, for small cells, the total ratio between UL and DL-centric subframes can largely vary over time. Thus, depending on the cell size and the loading of the cell, the downlink and uplink patterns may change, and the ratio between uplink and downlink-centric subframes may be any suitable ratio, from one-to-one, or otherwise.

If the uplink-centric subframe is very rare, then, and downlink-centric subframes dominate, there may be a problem in that a device with critical or time-sensitive uplink information to transmit may need to wait for an extended period of time until its uplink information can be transmitted. In particular, control information such as channel quality information and feedback like packet acknowledgments may have a time-sensitive nature, and their rapid transmission is important. Therefore, including a common UL burst portion 518 in each subframe, including the downlink-centric subframes, can help reduce or avoid such an extended latency for time-sensitive UL packets.

In a further aspect of the disclosure, such a common UL burst scheme provides for the same channel structure to be utilized in unlicensed bands as well as licensed bands. In unlicensed bands, users typically compete for resources, and are only able to reserve use of the channel for a limited time before giving up the channel for other users. Here, if a transmission is made just at the end of the time when a user has the channel, and the device loses the channel before having an opportunity to transmit an acknowledgment (or other time-critical uplink packet), the device may be required to wait for an extended period to make such transmission, until the channel can be re-acquired. However, with the common UL burst channel structure, a resource for such transmissions can be made available in every subframe, reducing or avoiding such a delay for time-critical transmissions. In some aspects of the disclosure, the common UL burst may be provided in every N predetermined number of subframes, where N has a value of 2 or greater.

The common UL burst may additionally or alternatively be utilized for the transmission of other control information, such as a scheduling request (SR). A scheduling request may be an uplink transmission of information requesting a scheduling entity (e.g., a base station or eNB) to schedule uplink channel resources for the device to utilize to transmit uplink data. These resources may appear within the regular UL burst region illustrated in the uplink-centric subframe 502.

In still another example, the common UL burst portion 518 may additionally or alternatively be utilized to carry a sounding reference signal (SRS). Within an unpaired TDD spectrum, the channel that a scheduled device (e.g., a subordinate entity or UE) sees for downlink transmissions is the same channel that a scheduling entity (e.g., an eNB) sees for uplink transmissions. Therefore, channel characterization is somewhat simplified relative to that for FDD channels. That is, the scheduling entity generally can acquire information about the downlink channel as seen by the receiving or scheduled entity in order to suitably schedule resources for that user using a TDD channel. While in an FDD channel a UE measures the channel and sends feedback to the eNB to report its channel conditions, in a TDD channel, the UE or scheduled device may transmit the SRS in an uplink transmission, and the eNB or scheduling entity may utilize this transmission to characterize the channel on its own for scheduling downlink transmissions. This SRS transmission is generally desired to be transmitted with low latency, i.e., its transmission is somewhat time critical. Thus, placement of the SRS within the common UL burst region can decouple its latency from the downlink-to-uplink pattern or uplink-to-downlink pattern in a given implementation.

Of course, the above are merely examples, and within the scope of the present disclosure, the common UL burst may be utilized not only for such control information, but may additionally or alternatively be utilized to carry uplink payload data (e.g., user data) with a low latency requirement or predetermined latency. Here, such uplink payload transmissions in the common UL burst region may be limited to transmitting devices having sufficient power headroom for these transmissions. The power headroom of the transmitting device or transmitter is a measure of the power margin available for producing higher levels of output power for transmitting a given signal.

Coupled Mode Vs. Decoupled Mode

Referring once again to FIG. 1, a UE 126 is illustrated relatively far from the base station 112 (e.g., at or near a cell edge), while another UE 128 is illustrated relatively close to the base station 112 (e.g., at or near a cell center). As described further below, according to various aspects of the present disclosure, users located at the cell center similar to the UE 128 may have sufficient power headroom to include data transmissions (e.g., payload data) in the common UL burst, while users located at the cell edge similar to the UE 126 may lack the power headroom to include data transmissions in the common UL burst. Accordingly, in various aspects of the disclosure, users at the cell edge may be configured to make their common UL burst transmissions in a coupled mode that facilitates coverage extension for control information transmissions, while users at the cell center may be configured to make their common UL burst transmissions in a decoupled mode that facilitates user data transmissions in addition to control information transmissions. The coupled mode and decoupled mode will be described in more detail below in relation to FIGS. 6-8.

That is, these common UL burst regions within the subframes as described above may be configured to support all users, including users near the cell center, as well as users near a cell edge. For users at or near the cell edge (or weak coverage areas), whose signal may be weak because they are relatively far from the base station or scheduling entity, the content of the information within the common UL burst region may be limited to certain control information such as the packet acknowledgments (ACK) and scheduling requests (SR), which may be carried on a physical uplink control channel (PUCCH). For these users, transmissions may be made in a certain mode, referred to herein in the present disclosure as a coupled mode.

Figure 6:
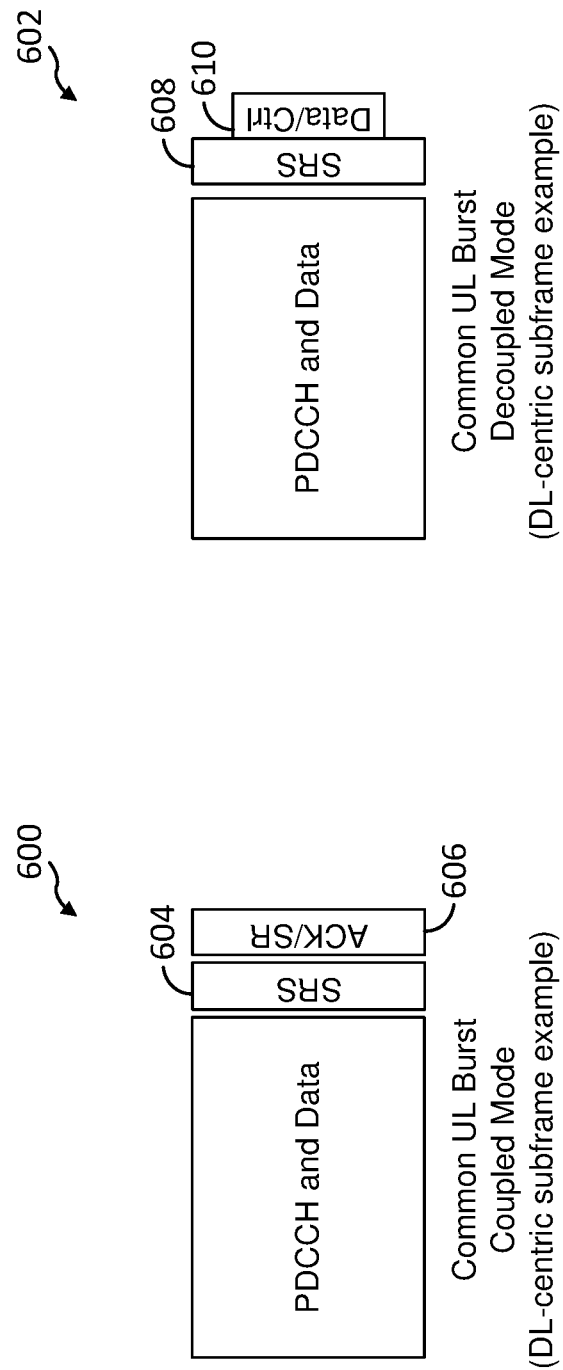
FIG. 6 is a schematic diagram showing a first common uplink burst configured according to a coupled mode and a second common uplink burst configured according to a decoupled mode.

FIG. 6 is a schematic illustration showing an exemplary downlink-centric subframe 600 having a common UL burst configured for coupled mode and an exemplary downlink-centric subframe 602 having a common UL burst configured for decoupled mode. The downlink-centric subframes 600 and 602 may be the same as the downlink-centric subframes

504 of FIG. 5. These coupled and decoupled modes are described in further detail below.

In the coupled mode, illustrated by the downlink-centric subframe 600, the SRS 604 may be re-used to serve the purpose of the demodulation reference signal (DM-RS), so that demodulation of the information bits in the common UL burst may be accomplished with the coupled SRS/DM-RS signal. That is, in coupled mode transmissions, DM-RS symbols that are separate from or decoupled from the SRS symbols may be omitted. In this way, for coupled mode transmissions, the additional power that may be consumed by the transmission of the DM-RS pilot symbols may be conserved. Thus, coupled mode transmissions (e.g., SRS/DM-RS coupled transmission) may have a reduced power consumption.

In particular, although a given device may have a multi-antenna configuration and a capability for multiple-input multiple-output (MIMO) transmissions, cell edge users may transmit only using their strongest antenna or their dominant precoder, without utilizing MIMO. For this reason, when such users are configured to transmit the common UL burst in the coupled mode, the SRS bits and the DM-RS bits need not be precoded separately. Therefore, in an aspect of the present disclosure, the SRS may be utilized for the purpose of a DM-RS, and accordingly, a separate DM-RS may be omitted. Here, to facilitate the use of the SRS as a demodulation reference signal, in an aspect of the disclosure, the symbol or symbols 606 carrying control information (e.g., ACK or SR) may occupy the same bandwidth as that of the symbol or symbols carrying the SRS 604.

The bandwidth of the symbols may be maintained as the same for coupled mode users because the received power of the UL transmissions from these users may be relatively weak, and therefore, these users' transmissions may be non-orthogonal to one another. Because these users' transmissions are weak, they generally do not substantially interfere with one another and accordingly, their transmissions may be superposed or overlap (non-orthogonal) in frequency and time while still being recoverable by the receiving base station.

Furthermore, according to some examples only control information (e.g., PUCCH) may be transmitted in the common UL burst in the coupled mode. That is, in these examples, data information (e.g., PUSCH) may be omitted from the common UL burst in the coupled mode. This is because the coupled mode users are generally devices that are relatively far from the base station or scheduling entity, so the power of the UL transmissions when they are received at the base station is relatively weak, and may be insufficient to support the data traffic in the short common UL burst. In some examples, both data information and control information may be transmitted in the common UL burst in the coupled mode. In this case, the data and SRS may be beamformed in the same way.

Therefore, as illustrated, in the common UL burst, for coupled mode users, an SRS and what may be considered "critical" (e.g., latency-sensitive or mission-critical) control information may be included. This control information (e.g., PUCCH) may include, for example, packet acknowledgments (ACK) and scheduling request (SR) packets.

On the other hand, a decoupled mode, illustrated by the downlink-centric subframe 602, may be targeted for users who may be relatively close to the scheduling entity or base station, because their signal may be more easily received by the base station. These devices generally have sufficient power headroom to accommodate the additional pilot or reference signal transmissions associated with the DM-RS. Therefore, if a user or subordinate entity is relatively close to the cell center or close to the base station or scheduling entity, the scheduling entity may accumulate enough energy even during the short common UL burst to decode the uplink payload data in the common UL burst region. Accordingly, in an aspect of the present disclosure, the decoupled mode is provided, e.g., for these users that are relatively close to the cell center or close to the base station or scheduling entity.

In the decoupled mode, the UE or subordinate entity may be enabled to opportunistically transmit uplink payload data having low latency requirements. That is, by virtue of the decoupled mode, devices operating in decoupled mode may be enabled to transmit information on a PUSCH within the common UL burst region of uplink-centric subframes and downlink-centric subframes. The present disclosure refers specifically to the PUSCH as an example, however, it is to be understood that this term is merely included for clarity, and aspects of the disclosure may utilize any suitable physical uplink channel for carrying traffic payload data.

Unlike in the coupled mode, in the decoupled mode, the bandwidth of the SRS symbol 608 need not be the same as the bandwidth of the second symbol 610, which may include PUCCH (control) as well as PUSCH (data) information. That is, because the SRS may not be used for demodulating the PUCCH and PUSCH, and the DM-RS is utilized for this purpose, the second symbol 610 can have a bandwidth that differs from the first symbol 608 including the SRS.

Within the present disclosure, the name "decoupled" with reference to the decoupled mode generally refers to a decoupling of the SRS from a demodulation reference signal (DM-RS). In order to demodulate the PUCCH or PUSCH, a pilot or reference signal may be needed. Here, the DM-RS provides a pilot that may be utilized to demodulate the PUCCH/PUSCH bits. In a decoupled mode, the SRS and the DM-RS are separate signals, and have different transmission characteristics. Thus, the SRS and DM-RS are decoupled from one another when a scheduled or subordinate entity operates in the decoupled mode.

In some examples, because decoupled mode users may generally be those that are relatively close to the scheduling entity or base station, those users may utilize multiple-input multiple-output (MIMO) or other beamforming techniques in their uplink transmissions.

That is, the subordinate entities 204 (e.g., UE 126/128, wireless communication devices 300, user equipment or UEs, etc.) may have multiple antennas supporting Multiple Input Multiple Output (MIMO) technology. The use of MIMO technology enables the wireless communication devices to exploit the spatial domain to support spatial multiplexing, beam-forming, and transmit diversity. Spatial multiplexing may be used to transmit different streams of data simultaneously on the same frequency. The data streams may be transmitted to a single receiving device to increase the data rate or to multiple receiving devices to increase the overall system capacity. This is achieved by spatially precoding each data stream (i.e., applying a scaling of an amplitude and a phase) and then transmitting each spatially precoded stream through multiple transmit antennas. The spatially pre-coded data streams arrive at the receiving device(s) with different spatial signatures, which enables each of the receiving devices to recover the one or more data streams destined for that device.

Spatial multiplexing is generally used when channel conditions are good. When channel conditions are less favorable, beamforming may be used to focus the transmission energy in one or more directions. This may be achieved by spatially precoding the data for transmission through multiple antennas.

Specifically referring to the common UL burst described above, in order to use MIMO, the transmitted information is suitably configured utilizing a certain precoding matrix. That is, in an aspect of the present disclosure, to enable MIMO or beamforming for the uplink data within the common UL burst, the uplink data transmitted within this common UL burst may be precoded utilizing a selected precoding matrix.

However, in a further aspect of the disclosure, the SRS transmission within the common UL burst may not be beamformed or precoded for MIMO transmission. For decoupled mode users who wish to use MIMO in their uplink transmissions, the pilot (i.e., the SRS) generally cannot be used as the demodulation reference signal (DM-RS) for demodulating the data, since the data and the pilot use different precoding, and are accordingly beamformed differently. Therefore, the SRS and its precoding or beamforming is decoupled from the DM-RS and its precoding or beamforming.

Multiple Access of Coupled Mode and Decoupled Mode Users

In an access network such as the one illustrated in FIG. 1, with one or more decoupled mode users (e.g., UEs 128) operating simultaneously to one or more coupled mode users (e.g., UEs 126), a suitable multiple access scheme is needed to enable the base station 112 or scheduling entity to properly receive and decode the differently formatted transmissions from coupled mode users and decoupled mode users.

Therefore, according to some aspects of the present disclosure, two different multiple access algorithms are disclosed for coupled and decoupled mode transmissions utilizing a common UL burst. In the discussion that follows, these algorithms are discussed in turn. First, a non-orthogonal multiple access scheme, and second, an orthogonal multiple access scheme. With these schemes, coupled mode and decoupled mode transmissions may occur simultaneously from a plurality of devices.

Non-Orthogonal Multiple Access

Figure 7:
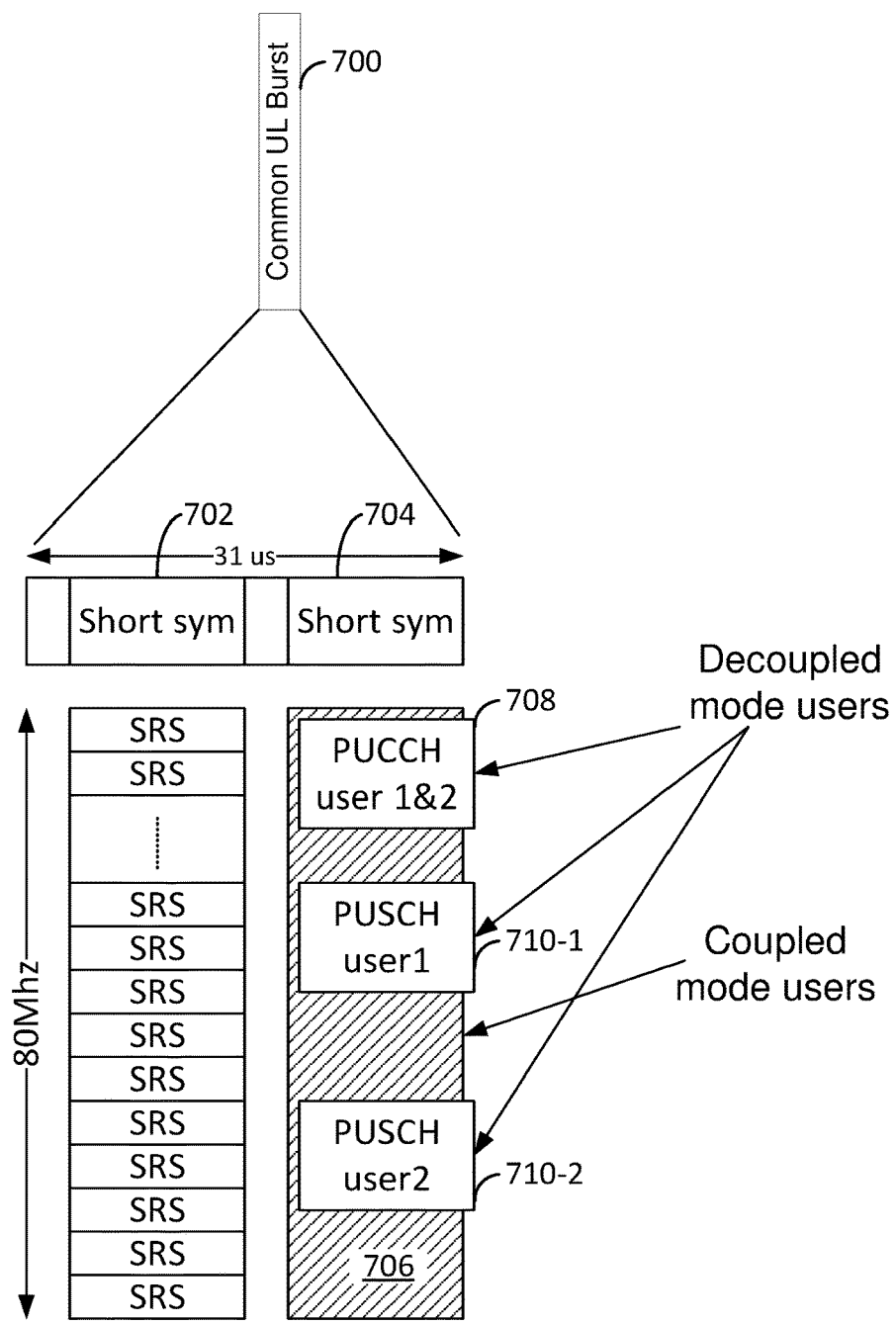
FIG. 7 is a schematic diagram illustrating non-orthogonal multiple access in a common uplink (UL) burst for coupled mode users and decoupled mode users according to some embodiments of the present disclosure.

FIG. 7 is a schematic illustration of a common UL burst 700 utilizing a non-orthogonal multiple access algorithm supporting the sharing of the channel by one or more coupled mode users, and as illustrated, two decoupled mode users. For example, the coupled mode users may be any of the devices located near the cell edge, and the decoupled mode users may be any of the devices located near the base station, as illustrated in FIG. 1. These numbers of coupled and decoupled mode users are merely exemplary in nature, and any number of users in either mode may appear within the scope of the present disclosure.

In the first symbol 702, all users in both coupled mode and decoupled mode may transmit their SRS, occupying the entire bandwidth. In the example of FIG. 7, the entire bandwidth is 80 MHz, although it is to be understood that this is merely one example, and any suitable bandwidth may be utilized in a particular implementation within the scope of the present disclosure. Here, the coupled mode and decoupled mode transmissions are non-orthogonal to one another, being superposed or overlapping one another's transmissions. The SRS transmissions of coupled mode users and decoupled mode users may be differentiated by use of unique (or at least user-specific) or different scrambling codes according to conventional CDMA techniques known to those of ordinary skill in the art.

In the second symbol 704, coupled mode users may transmit control information, e.g., utilizing a PUCCH. For the coupled mode users' PUCCH transmissions 706, each coupled mode user's transmission occupies all of the subcarriers in that symbol. Thus, the UL transmissions of the coupled mode users overlap with one another, and further overlap with decoupled mode users' UL transmissions.

Because the PUCCH for the coupled mode users is spread across all of the subcarriers, the communication of the decoupled mode users (i.e., their PUCCH and/or PUSCH) is non-orthogonal to the communication of the coupled mode users.

Therefore, in the second symbol 704, transmissions from coupled mode users may differ from transmissions from decoupled mode users. That is, as described above, coupled mode users may transmit their PUCCH (e.g., control information) using the same bandwidth as the SRS transmission. For example, coupled mode users may transmit their PUCCH to occupy the entire wide band or channel bandwidth. Each coupled mode user's PUCCH transmission in the second symbol 704 is non-orthogonal to that of other coupled mode users, and the coupled mode users' PUCCH transmissions may be differentiated by utilizing user-specific or different sequences or scrambling codes, known to those of ordinary skill in the art.

As for decoupled mode users, their transmissions in the second symbol 704 include a control region, for example, including a PUCCH 708, and optionally include a data region 710, including a PUSCH 710.

FIG. 7 is an exemplary illustration of multiple access for common UL burst transmissions by three or more users in accordance with one example. In the illustrated example, one coupled mode user is transmitting in the same common UL burst as two decoupled mode users (user 1 and user 2). Of course, any number of coupled and decoupled mode users may transmit during a given common UL burst 700, and these numbers are merely provided for illustrative purposes.

As seen in FIG. 7, both the coupled mode users and decoupled mode users share the first symbol 702 by transmitting their respective SRS, including each user's unique scrambling code. Thus, the receiving entity (e.g., a base station or scheduling entity) can differentiate the respective users' SRS by utilizing user-specific sequences or scrambling codes. In the second symbol 704, the coupled mode user transmits its PUCCH 706 occupying the entire wide band, i.e., having the same bandwidth as the transmission of the SRS in the first symbol 702. This coupled mode user's PUCCH transmission is scrambled with the user's unique scrambling code, for achieving multiple access with any other coupled mode user transmitting their own PUCCH in this symbol of the common UL burst.

The decoupled mode users' transmissions in the second symbol 704 of the common UL burst differ from one another. In the control region, both of the users may transmit their respective PUCCH 708 in an unscheduled manner, superposed over one another as well as that region or bandwidth of the coupled mode users' transmissions. Here, the PUCCH 708 of the decoupled mode users are non-orthogonal to one another, being differentiated by being scrambled with the respective users' unique scrambling codes, for achieving multiple access utilizing conventional CDMA techniques. However, the PUSCH or payload data of each decoupled mode user occupies scheduled resources (e.g., different frequency subcarriers), so that decoupled mode users' data region transmissions 710-1 and 710-2 may be orthogonal to one another. That is, each decoupled mode user may transmit a scheduling request, for example, within the PUCCH region of a common UL burst. In response, the network may transmit a scheduling grant to the decoupled mode user, assigning a particular set of resources in the data region 710 of a common UL burst. Accordingly, the decoupled mode user may utilize the assigned resources for transmission of its PUSCH 710 in the data region (e.g., second symbol 704) of a common UL burst. Here, multiple access among the decoupled mode users may be achieved by way of Orthogonal Frequency-Division Multiple Access (OFDMA), with the scheduled transmissions occupying distinct sets of subcarriers within the data region of the common UL burst.

It may be observed that the decoupled mode users' control and data transmissions 708 and 710 (710-1 and 710-2) in the second symbol 704 are non-orthogonal to the coupled mode users' PUCCH transmissions 706. Accordingly, there may be interference between the respective coupled mode and decoupled mode users. In particular, because the decoupled mode may be applied to users near the cell center or base station, the power of their transmissions received at the base station may be quite strong, and may create substantial interference to the PUCCH transmissions from the coupled mode users, whose transmissions from near the cell edge may be weak at the receiving base station or scheduling entity. According to various aspects of the present disclosure, the receiving base station or scheduling entity may account for this interference utilizing a suitable interference handling algorithm or technique.

Interference Handling

In one aspect of the present disclosure, a successive interference cancellation (SIC) receiver may be employed at the receiving scheduling entity. SIC receivers are generally known to those of ordinary skill in the art, and are implemented in many conventional base stations, e.g., those deployed in existing CDMA networks. In one example, a SIC receiver may be implemented with the interference cancellation block 336 of FIG. 3.

To account for the interference between coupled and decoupled mode users, the scheduling entity may utilize the SIC receiver to first decode the signals received from the relatively high power decoupled mode users. Once decoded, these transmissions may be reconstructed, and cancelled to remove their signal from the received waveform using interference cancellation techniques known to those of ordinary skill in the art. Once the decoupled mode users' signals are cancelled out or removed, the scheduling entity may utilize the SIC receiver to decode the relatively weak signals received from the coupled mode users.

In another aspect of the disclosure, rise over thermal (RoT) control may be employed by the receiving scheduling entity to handle interference between coupled mode users and decoupled mode users. RoT is the ratio between the total power received at the scheduling entity and the thermal noise. RoT is well-known to those of ordinary skill in the art, and many existing networks employ a variety of techniques to manage and control the RoT that results from the transmissions of network users.

The signals received from coupled mode users may be relatively weak, and their transmissions are spread across the bandwidth. Thus, the RoT resulting from these coupled mode transmissions may be relatively low. However, the RoT arising from the decoupled mode users, particularly in relation to their PUSCH or data region transmissions, may become problematic. Accordingly, as long as these decoupled mode users' transmissions are suitably controlled, the total RoT that they contribute may be sufficiently moderated or controlled so that all users' transmissions (coupled mode and decoupled mode transmissions) may be decoded without using signal cancellation techniques or a SIC receiver.

Therefore, according to an aspect of the disclosure, the scheduling entity may utilize an RoT control algorithm to actively control one or more transmission parameters of the decoupled mode users to moderate the RoT contributed from their transmissions. In one example, the RoT control algorithm may be implemented at the RoT controller of FIG. 3. The scheduling entity may specify a suitable modulation and coding scheme (MCS) for each decoupled mode user for their PUSCH or data region transmissions such that their RoT contribution may be controlled.

In another example, the scheduling entity or the RoT controller may employ power control of the PUCCH transmissions of both the coupled mode users and the decoupled mode users to reduce the RoT resulting from their respective PUCCH transmissions. That is, although the RoT resulting from coupled mode users may be relatively small, if there are large numbers of these coupled mode users transmitting in the common UL burst, they can still contribute to a large RoT. Therefore, controlling (e.g., reducing) the power of the coupled mode users' PUCCH transmissions can moderate the RoT. Similarly, the PUCCH transmissions of the decoupled mode users may be power controlled by the scheduling entity utilizing the RoT controller.

For example, the scheduling entity may set a suitable RoT threshold, and may transmit one or more control signalings to users to suitably configure their MCS and/or their transmission power such that their transmissions in the common UL burst do not cause the RoT to exceed the RoT threshold. These control signalings for controlling the RoT may be broadcast to a set of users, particularly for the SRS and for the control regions of a subframe where the transmission resources may be shared by multiple users. In another example, these control signalings for controlling the RoT may be unicast to a particular user, particularly for the PUSCH transmissions by decoupled mode users that transmit utilizing scheduled resources. A receiver (scheduling entity) of the UL transmissions can demodulate, differentiate, and estimate the received power of each individual user, for example, coupled mode users and decoupled mode users. Therefore, the scheduling entity can determine which user's transmission is causing undesirably large RoT.

Orthogonal Multiple Access

Figure 8:
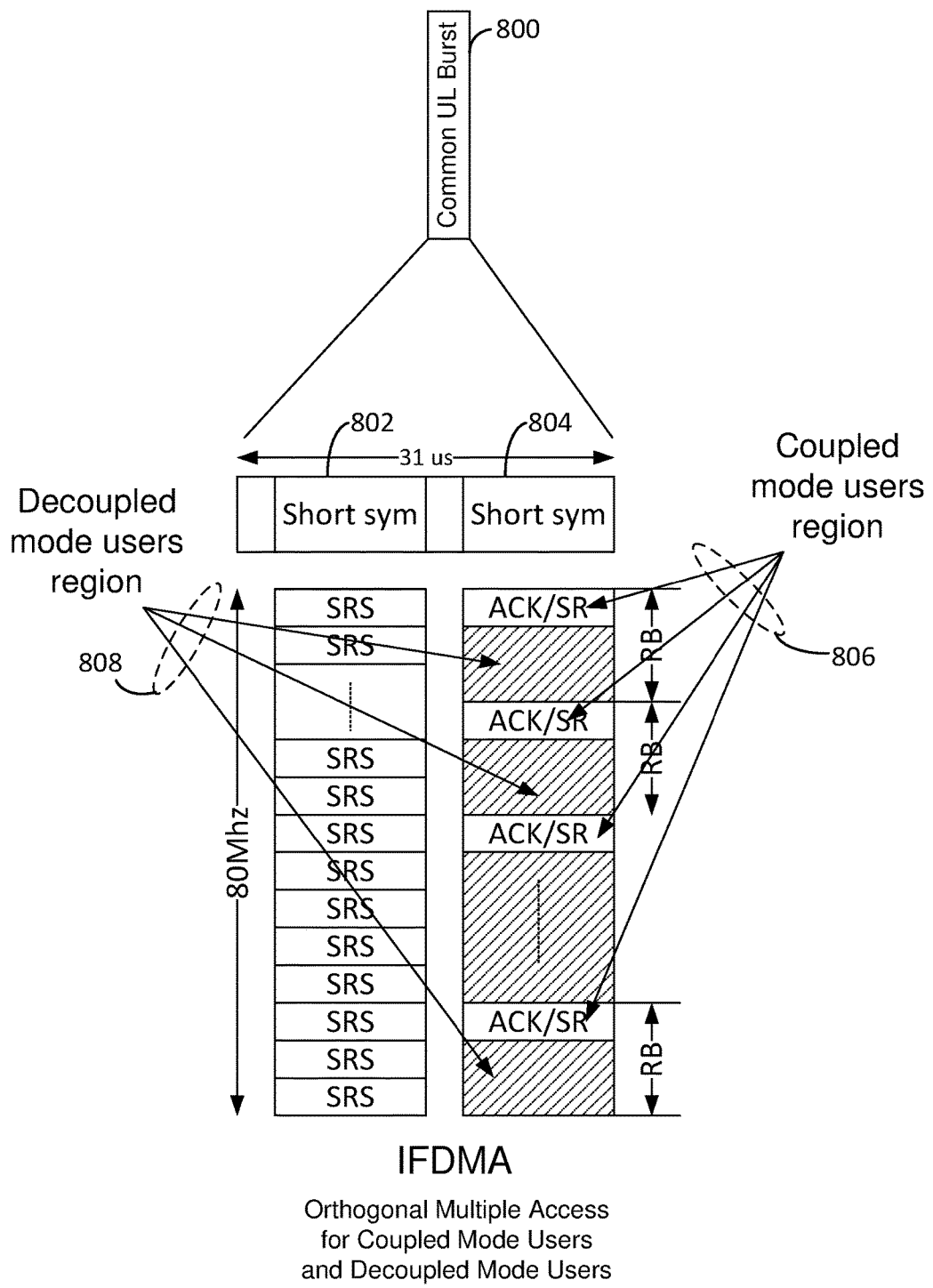
FIG. 8 is a schematic diagram illustrating orthogonal multiple access in a common UL burst for coupled mode users and decoupled mode users according to some embodiments of the present disclosure.

FIG. 8 is a schematic illustration of a common UL burst 800 utilizing an orthogonal multiple access algorithm supporting the sharing of the channel by one or more coupled mode users, and one or more decoupled mode users.

In this example, in the same way as for the non-orthogonal multiple access scheme described above, the first symbol 802 includes SRS transmissions shared by all users in both coupled mode and decoupled mode. That is, the first symbol 802 including the SRS transmissions may be substantially the same in the orthogonal scheme as in the non-orthogonal scheme shown in FIG. 7.

For coupled mode users, the second symbol 804 in the common UL burst includes a wideband transmission 806 of the PUCCH, occupying the same bandwidth (e.g., 80 MHz in FIG. 8) as the SRS in the first symbol 802. That is, the PUCCH of the coupled mode users may span the entire available bandwidth. Furthermore, for coupled mode users, the second symbol 804 in the common UL burst is configured as a single carrier waveform. Therefore, for orthogonal multiple access with decoupled mode users, whose transmissions may be a higher power OFDMA waveform and utilizing scheduled resources, certain considerations must take place for the symbol structure in each mode.

According to an aspect of the present disclosure, interleaved frequency division multiple access (IFDMA) may be utilized to enable orthogonal multiple access for coupled mode users and decoupled mode users in a common UL burst transmission as illustrated in FIG. 8.

In the common UL burst 800, the resources may be allocated in the frequency domain according to a set of subcarriers or tones. By implementing IFDMA, a coupled mode user's transmission 806 may, for example, occupy every other tone, in a periodic fashion. In this way, the PUCCH transmission in the second symbol 804 may be a single carrier waveform. In another example, a single carrier transmission may be carried out by transmitting in every third tone rather than every other tone. This may enable the coupled mode users' transmissions to be spread across the entire carrier and occupy the same bandwidth as that of the SRS (so that the SRS may be utilized as the demodulation pilot for the coupled mode users' PUCCH), while still maintaining suitable frequency diversity across the PUCCH, which is important for reliability of transmission for the weak-signal coupled mode users.

In this way, the tones or subcarriers in between those occupied by coupled mode users may be available for data transmission by the decoupled mode users. That is, because the decoupled mode users are configured to utilize an OFDM waveform for their PUCCH/PUSCH transmission, these decoupled mode users may fit their transmissions 808 in between, or interleaved with, the tones 806 occupied by the coupled mode users.

A characteristic of OFDM transmissions is that essentially arbitrary subcarrier assignments may be given to users using OFDM. Accordingly, in an aspect of the present disclosure, decoupled mode users may be configured to transmit their PUCCH and (if transmitted) their PUSCH in the tones 808 or subcarriers unoccupied by the coupled mode users.

Figure 9:
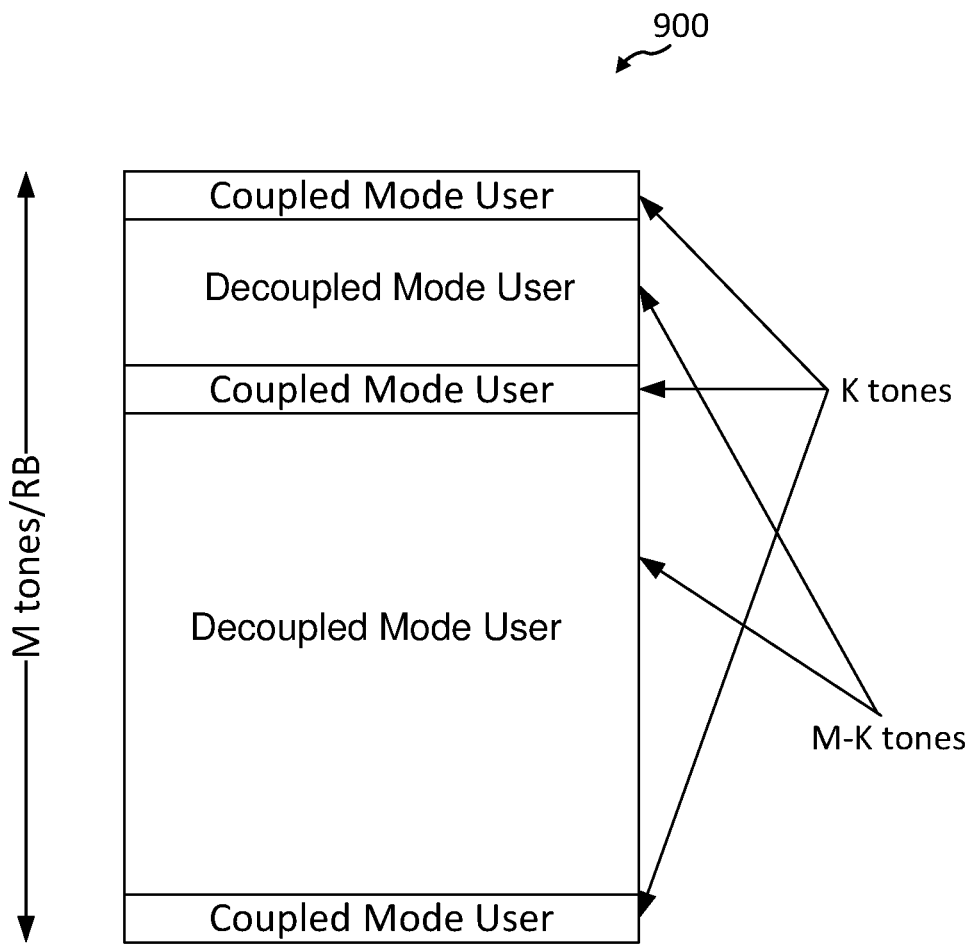
FIG. 9 is a schematic diagram illustrating a resource block having M contiguous tones for transmission of a common UL burst according to an embodiment of the present disclosure.

Therefore, in another aspect of the present disclosure illustrated in FIG. 9, for every UL resource block 900 having M contiguous tones for transmitting the second symbol of a common UL burst, this resource block may have k tones reserved for coupled mode users, and (M-k) tones reserved for decoupled mode users. For the coupled mode users, multiple access to the k tones may be achieved in an orthogonal manner or in a non-orthogonal manner. For orthogonal multiple access among the coupled mode users, it may be the case, for example, that a first user (user 1) occupies every third tone (e.g., tones 1, 4, 7, 10, 13 . . . ) and a second user (user 2) occupies every third tone (e.g., tones 2, 5, 8, 11, 14 . . . ). In this way, both users 1 and 2 maintain a single carrier waveform by occupying every third tone of the resource block in a periodic fashion, while occupying the same bandwidth as that of the SRS in the first symbol. Still, users 1 and 2 are orthogonal to one another, while leaving some tones (e.g., tones 3, 6, 9, 12, 15 . . . ) for the decoupled mode users' transmissions in the common UL burst.

This scheme can be extended to accommodate any number of orthogonal coupled mode users, each occupying a different subset of the k tones reserved for coupled mode users. Moreover, each subset of the k tones may be shared by a cluster of users non-orthogonally occupying those same subset of k tones. That is, referring to the example described previously, two or more users may occupy tones 1, 4, 7, 10, 13 . . . , k.

Figure 10:
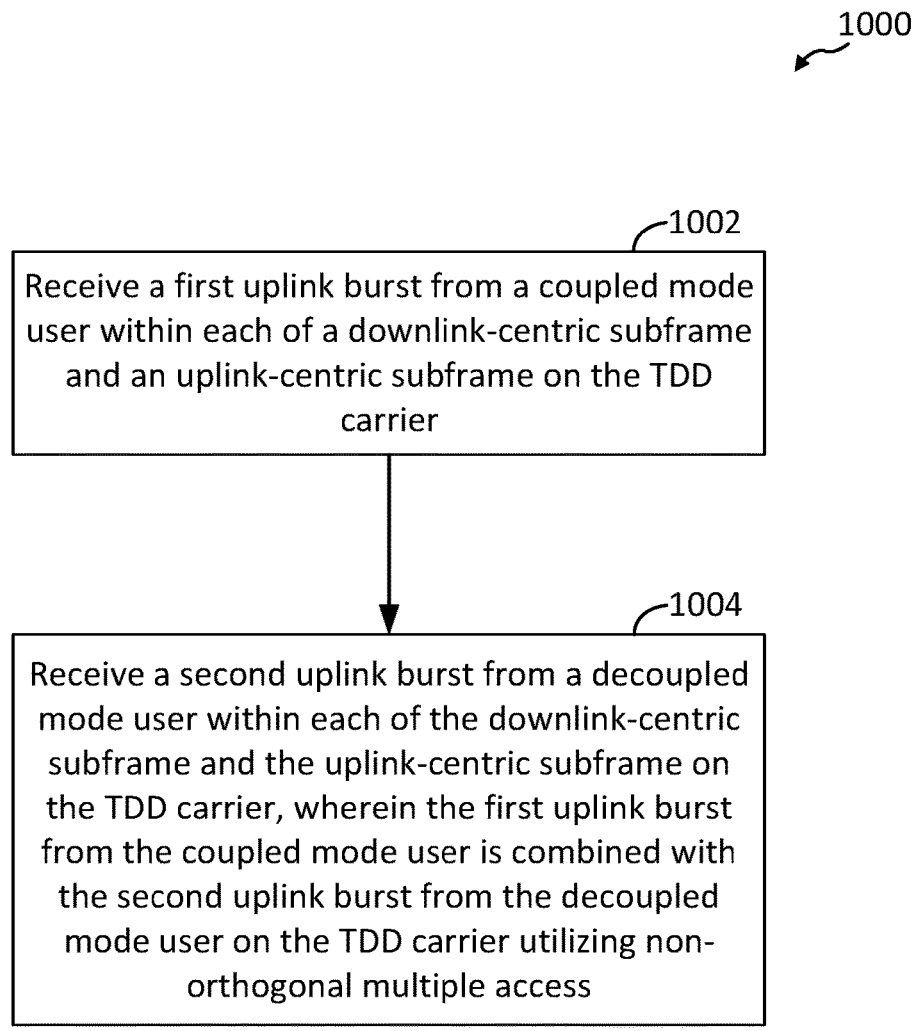
FIG. 10 is a flowchart illustrating a non-orthogonal multiple access method for coupled mode and decoupled mode users in wireless communication according to an embodiment of the disclosure.

FIG. 10 is a flowchart illustrating a non-orthogonal multiple access method 1000 for coupled mode and decoupled mode users in wireless communication in accordance with an aspect of the disclosure. For example, this method may be performed by any scheduling entity, e.g., as illustrated in FIGS. 1-4 in a common UL burst over a time division duplex (TDD) carrier. At block 1002, a scheduling entity may utilize a transceiver 310 (see FIG. 3) and/or a coupled mode user control block 320 to receive a first uplink burst from a coupled mode user within each of a downlink-centric subframe and an uplink-centric subframe on the TDD carrier. For example, the first uplink burst may be received in the DL-centric subframe and UL-centric subframe shown in FIG. 5. In one aspect of the disclosure, the first uplink burst may be the PUCCH transmission 706 of a coupled mode user shown in FIG. 7.

At block 1004, the scheduling entity may utilize the transceiver 310 and/or a decoupled mode user control block 322 to receive a second uplink burst from a decoupled mode user within each of the downlink-centric subframe and the uplink-centric subframe on the TDD carrier. For example, the second uplink burst may be received in the DL-centric subframe and UL-centric subframe shown in FIG. 5. In one aspect of the disclosure, the second uplink burst includes the PUCCH 708 and/or PUSCH 710 of a decoupled mode user shown in FIG. 7. The first uplink burst from the coupled mode user is combined with the second uplink burst from the decoupled mode user on the TDD carrier utilizing non-orthogonal multiple access. That is, the first uplink burst and the second uplink burst overlap in frequency or bandwidth.

Figure 11:
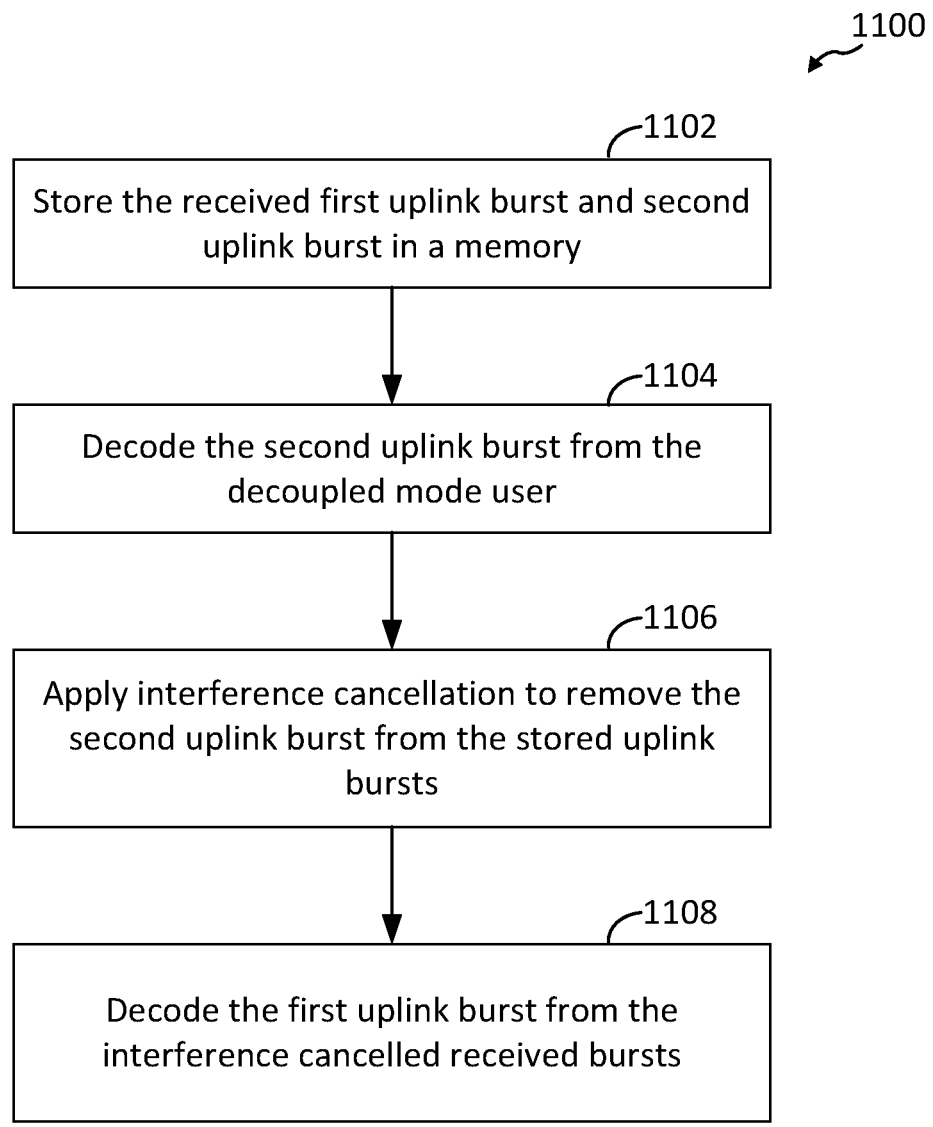
FIG. 11 is a flowchart illustrating an interference cancellation method for handling interference between non-orthogonal uplink bursts of coupled mode users and decoupled mode users according to an embodiment of the disclosure.

FIG. 11 is a flowchart illustrating an interference cancellation method 1100 for handling interference between non-orthogonal uplink bursts from coupled mode users and decoupled mode users in accordance with an aspect of the disclosure. In one example, this method 1100 may be performed by a scheduling entity illustrated in any of FIGS. 1-4 when performing the non-orthogonal multiple access method 1000 of FIG. 10.

In one scenario, a scheduling entity receives a first uplink burst from a coupled mode user and a second uplink burst from a decoupled mode user similar to those shown in FIG. 7. At block 1102, the scheduling entity stores the received first uplink burst and second uplink burst in memory. For example, the scheduling entity may utilize the memory 305 (see FIG. 3) to store the uplink bursts. At block 1104, the scheduling entity decodes the second uplink burst from the decoupled mode user. For example, the scheduling entity may utilize a receiver 418RX and/or an RX processor 470 (see FIG. 4) to decode and recover the information of the second uplink burst.

At block 1106, the scheduling entity applies interference cancellation to remove the second uplink burst from the stored received bursts. In one example, the scheduling entity may utilize an interference cancellation block 336 (see FIG. 3) to perform successive interference cancellation (SIC) techniques, which are known in the art, to remove the second uplink burst from the received bursts. After applying SIC or other suitable interference cancellations, the stored uplink bursts in the memory contain data corresponding to the first uplink burst. At block 1108, the scheduling entity decodes the first uplink burst from the interference cancelled uplink bursts. For example, the scheduling entity may utilize the receiver 418RX and/or an RX processor 470 (see FIG. 4) to decode and recover the information of the first uplink burst.

Figure 12:
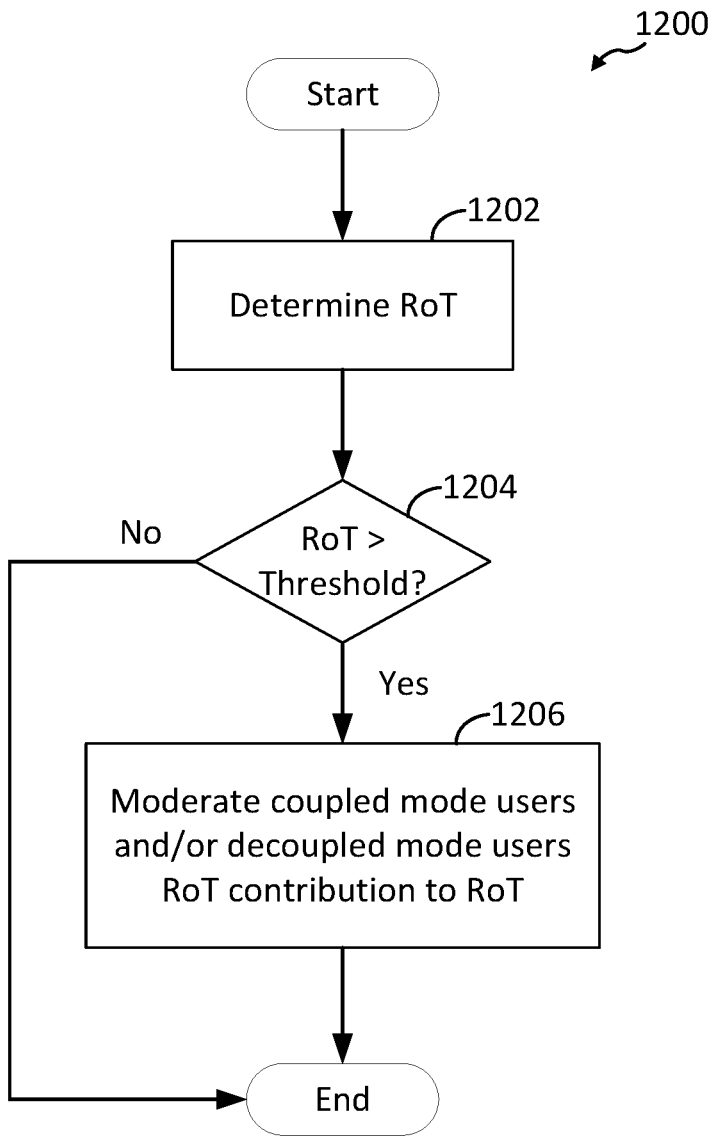
FIG. 12 is a flowchart illustrating a rise of thermal (RoT) based interference handling method for handling interference between non-orthogonal uplink bursts of coupled mode users and decoupled mode users according to an embodiment of the disclosure.

FIG. 12 is a flowchart illustrating an RoT based interference handling method 1200 for handling interference between non-orthogonal uplink bursts from coupled mode users and decoupled mode users in accordance with an aspect of the disclosure. In one example, this interference handling method 1200 may be performed by a scheduling entity illustrated in any of FIGS. 1-4 when performing the non-orthogonal multiple access method 1000 of FIG. 10.

In one scenario, a scheduling entity receives a first uplink burst from a coupled mode user and a second uplink burst from a decoupled mode user similar to those shown in FIG. 7. At block 1202, the scheduling entity determines an RoT for example utilizing an RoT block 334 (see FIG. 3). RoT may be determined as a ratio between the total interference or total wideband power received and the thermal noise. At decision block 1204, the scheduling entity may utilize the RoT block 334 to determine whether or not the RoT is greater than a predetermined threshold value. An example of the RoT threshold value may be 6 dB. If the RoT is greater than the threshold, at block 1206, the scheduling entity utilizes the RoT block 334, coupled mode user control block 320, and/or decoupled mode user control block 322 to modulate the RoT contribution of the coupled mode users and/or decoupled mode users.

For example, the scheduling entity may transmit one or more control messages in the PDCCH to one or more decoupled mode users and/or coupled mode users to reduce the UL power in one or more UL channels (e.g., PUCCH and PUSCH). The control message may include one or more transmit power control (TPC) commands or other suitable power control commands. In response to a TPC command, the decoupled mode user and/or coupled mode user may increase, decrease or maintain the UL transmit power. Therefore, using TPC commends, the scheduling entity may moderate the RoT contribution of the coupled mode users and decoupled mode users.

Figure 13:
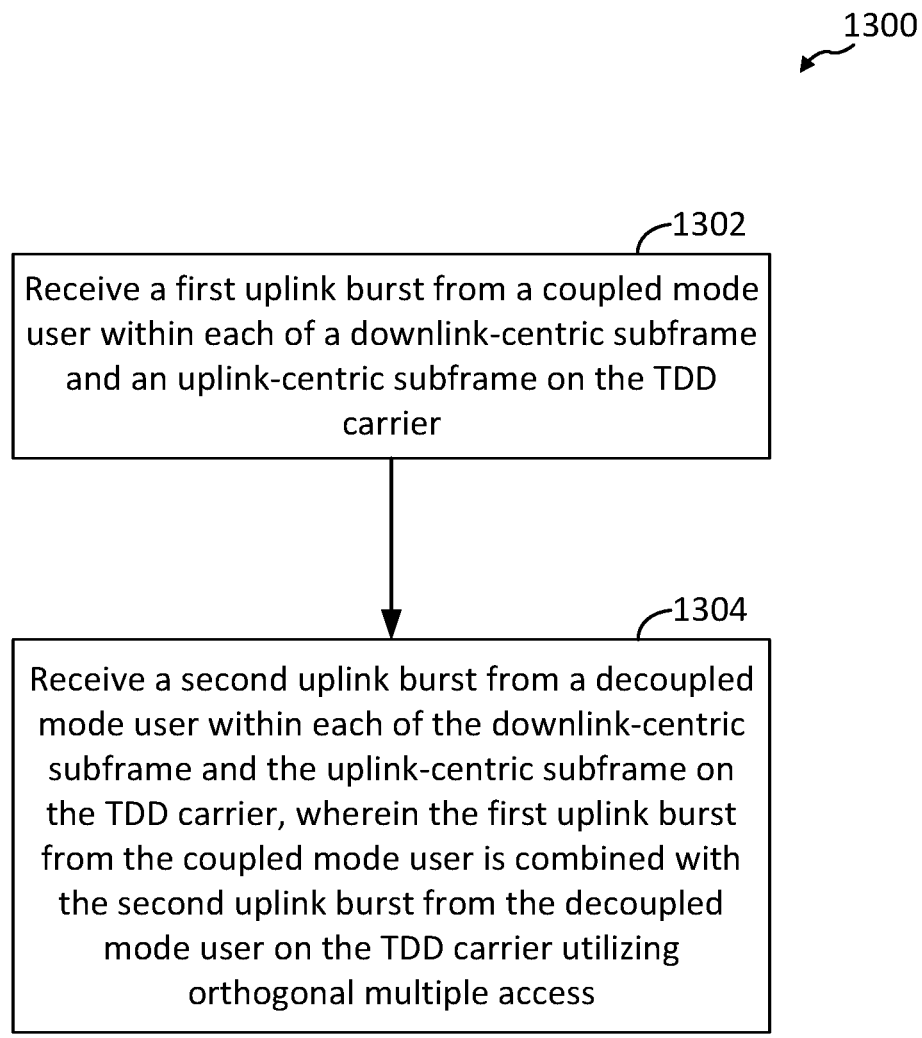
FIG. 13 is a flowchart illustrating an orthogonal multiple access method for coupled mode and decoupled mode users in wireless communication according to an embodiment of the disclosure.

FIG. 13 is a flowchart illustrating an orthogonal multiple access method 1300 for coupled mode and decoupled mode users in wireless communication in accordance with an aspect of the disclosure. For example, this method may be performed at any scheduling entity as illustrated in FIGS. 1-4 over a TDD carrier. At block 1302, a scheduling entity may utilize a transceiver 310 (see FIG. 3) and/or a coupled mode user control block 320 to receive a first uplink burst from a coupled mode user within each of a downlink-centric subframe and an uplink-centric subframe on the TDD carrier. For example, the first uplink burst may be received in the DL-centric subframe and UL-centric subframe shown in FIG. 5. In one aspect of the disclosure, the first uplink burst may be the PUCCH transmission 806 of a coupled mode user shown in FIG. 8.

At block 1304, the scheduling entity may utilize the transceiver 310 and/or a decoupled mode user control block 322 to receive a second uplink burst from a decoupled mode user within each of the downlink-centric subframe and the uplink-centric subframe on the TDD carrier. For example, the second uplink burst may be the PUCCH 808 of a decoupled mode user shown in FIG. 8. The first uplink burst from the coupled mode user is combined with the second uplink burst from the decoupled mode user on the TDD carrier utilizing orthogonal multiple access as described above for example in FIG. 8. That is, the first uplink burst and the second uplink burst are transmitted in non-overlapping frequencies or carriers.

In one aspect of the disclosure, the first uplink burst from the coupled mode user includes at least one symbol with uplink control information. For example, the symbol may be the symbol 804 shown in FIG. 8. The uplink control information may be structured as a single carrier waveform using interleaved frequency division multiple access (IFDMA) occupying a subset of subcarriers across resource blocks in the TDD carrier. For example, the uplink control information may be similar to the IFDMA uplink transmission 806 shown in FIG. 8.

In one aspect of the disclosure, the second uplink burst from the decoupled mode user includes at least one symbol with uplink control information. For example, the uplink control information may be structured as an orthogonal frequency division multiplexed (OFDM) waveform 808 interleaved between at least a portion of the subcarriers making up the uplink control information corresponding to the first uplink burst 806 from the coupled mode user as illustrated in FIG. 8.

Figure 14:
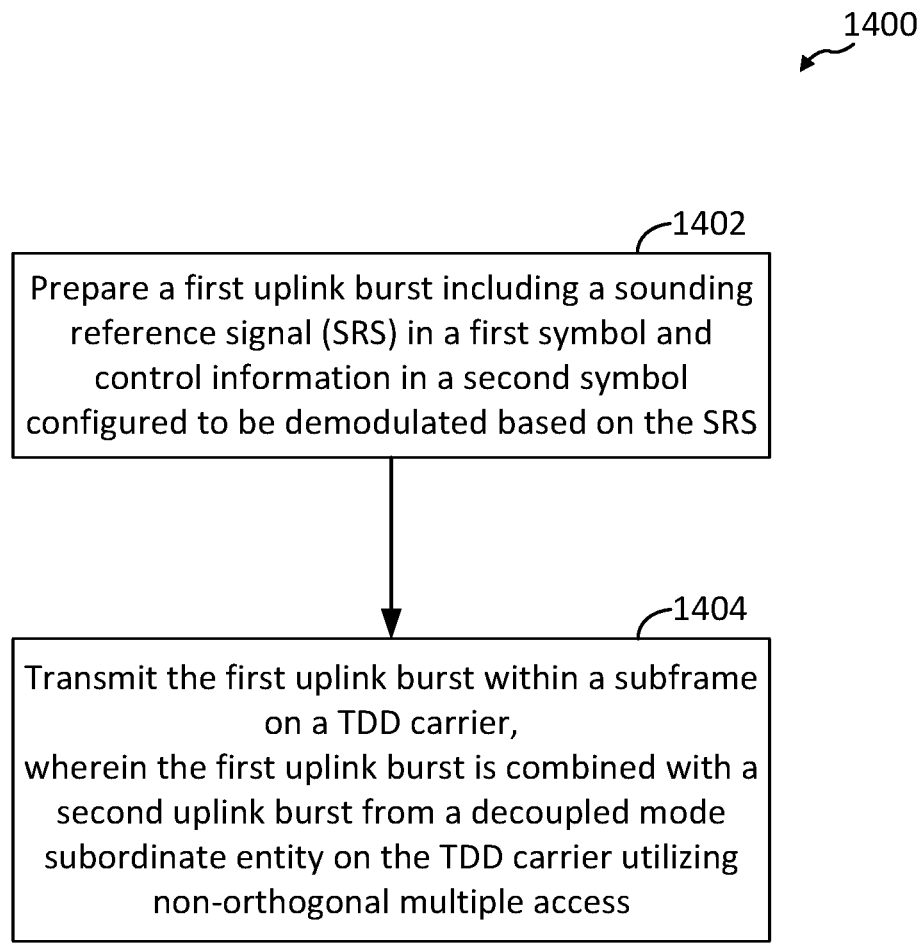
FIG. 14 a flowchart illustrating a non-orthogonal multiple access method operable at a coupled mode subordinate entity for wireless communication over a time division duplex (TDD) carrier in accordance with an aspect of the disclosure

FIG. 14 is a flowchart illustrating a non-orthogonal multiple access method 1400 operable at a coupled mode subordinate entity for wireless communication over a TDD carrier in accordance with an aspect of the disclosure. For example, this method may be performed by any subordinate entity, e.g., as illustrated in FIGS. 1-4 in a common UL burst over a TDD carrier.

At block 1402, a subordinate entity prepares a first uplink burst including a sounding reference signal (SRS) in a first symbol and control information in a second symbol configured to be demodulated based on the SRS. For example, a subordinate entity 204 (see FIG. 4) may utilize one or more of a TX processor 468, a channel estimator, and/or a data source 467 to prepare a first uplink burst 700 (see FIG. 7). At block 1404, the subordinate entity may utilize the transmitters 454TX to transmit the first uplink burst within a subframe on the TDD carrier. The first uplink burst is combined with a second uplink burst from a decoupled mode subordinate entity on the TDD carrier utilizing non-orthogonal multiple access. For example, the first uplink burst may be the PUCCH 706 (FIG. 7) of coupled mode users, and the second uplink burst may be the PUCCH 708 and/or PUSCH 710 (FIG. 7) of decoupled mode users.

Figure 15:
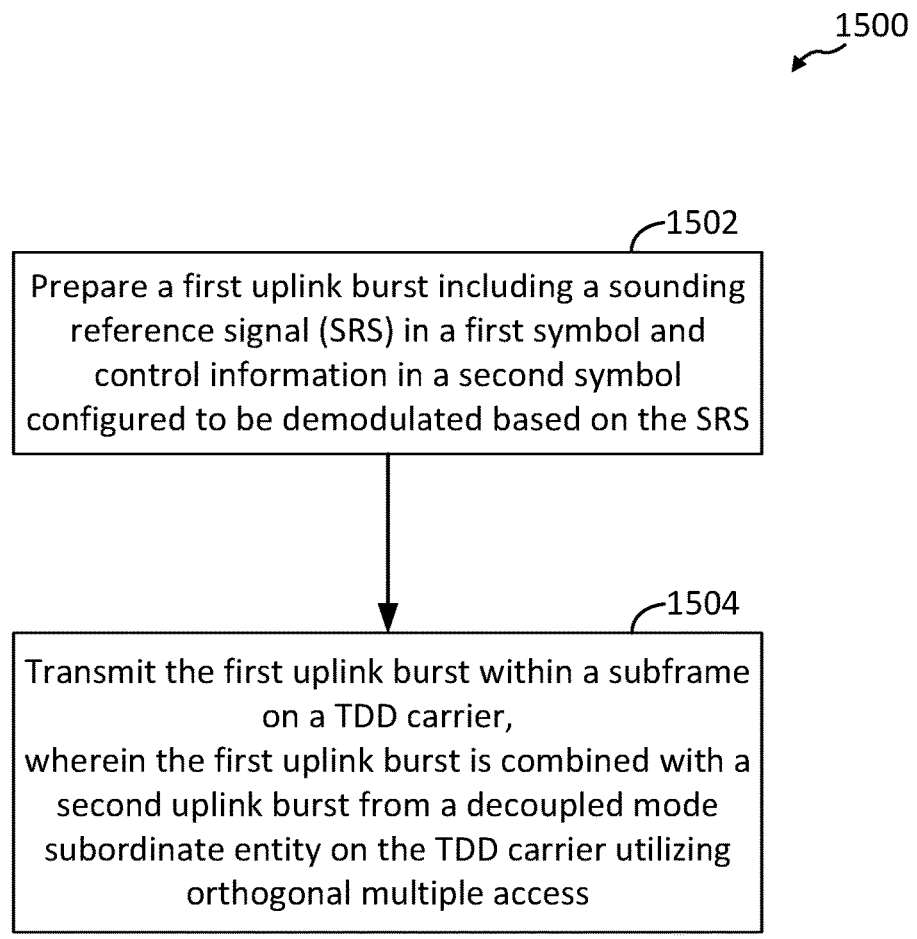
FIG. 15 is a flowchart illustrating an orthogonal multiple access method operable at a coupled mode subordinate entity for wireless communication over a TDD carrier in accordance with an aspect of the disclosure.

FIG. 15 is a flowchart illustrating an orthogonal multiple access method 1500 operable at a coupled mode subordinate entity for wireless communication over a TDD carrier in accordance with an aspect of the disclosure. For example, this method may be performed by any subordinate entity, e.g., as illustrated in FIGS. 1-4 in a common UL burst over a TDD carrier.

At block 1502, a subordinate entity prepares a first uplink burst including a sounding reference signal (SRS) in a first symbol and control information in a second symbol configured to be demodulated based on the SRS. For example, a subordinate entity 204 (see FIG. 4) may utilize one or more of a TX processor 468, a channel estimator, and/or a data source 467 to prepare a first uplink burst 800 (see FIG. 8). At block 1504, the subordinate entity may utilize the transmitters 454TX to transmit the first uplink burst within a subframe on the TDD carrier. The first uplink burst is combined with a second uplink burst from a decoupled mode subordinate entity on the TDD carrier utilizing orthogonal multiple access. For example, the first uplink burst may be the PUCCH 806 (FIG. 8) of coupled mode users, and the second uplink burst may be the PUCCH/ PUSCH 808 (FIG. 8) of decoupled mode users.

Figure 16:
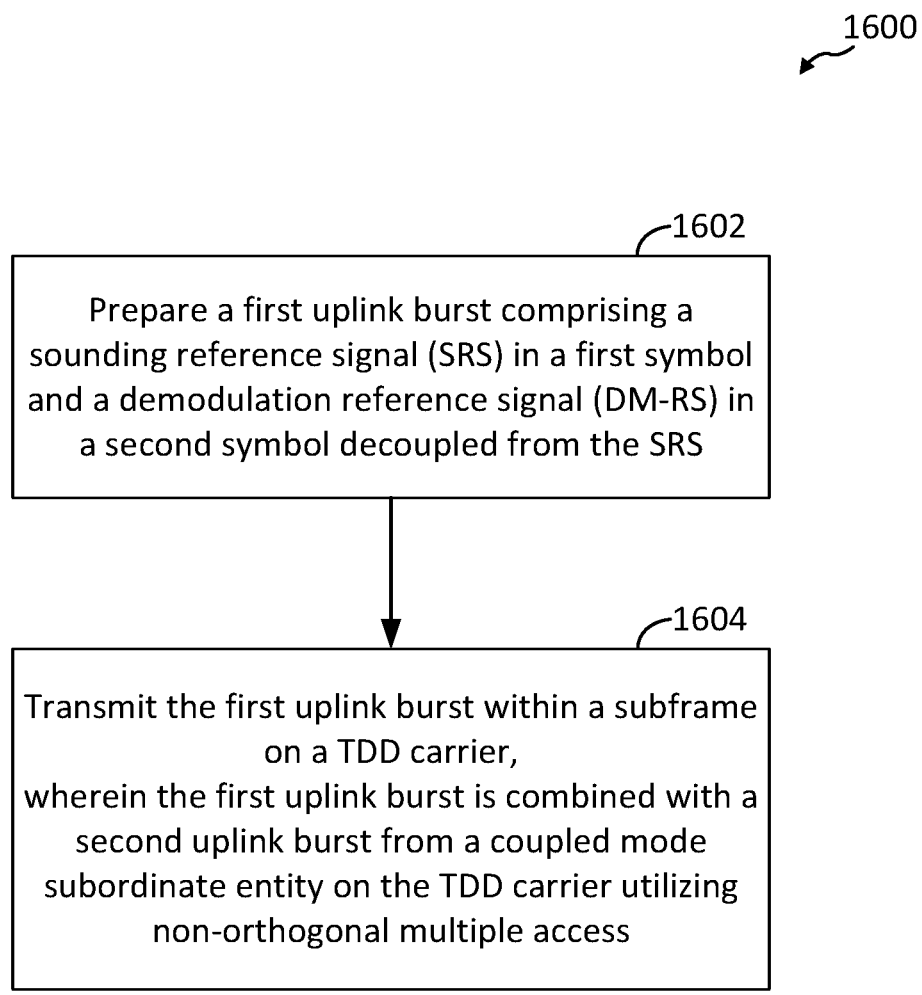
FIG. 16 is a flowchart illustrating a non-orthogonal multiple access method operable at a decoupled mode subordinate entity for wireless communication over a TDD carrier in accordance with an aspect of the disclosure.

FIG. 16 is a flowchart illustrating a non-orthogonal multiple access method 1600 operable at a decoupled mode subordinate entity for wireless communication over a TDD carrier in accordance with an aspect of the disclosure. For example, this method may be performed by any subordinate entity, e.g., as illustrated in FIGS. 1-4 in a common UL burst over a TDD carrier.

At block 1602, a subordinate entity prepares a first uplink burst including a sounding reference signal (SRS) in a first symbol and a demodulation reference signal (DM-RS) in a second symbol decoupled from the SRS. For example, a subordinate entity 204 (see FIG. 4) may utilize one or more of a TX processor 468, a channel estimator, and/or a data source 467 to prepare a first uplink burst 700 (see FIG. 7). At block 1604, the subordinate entity may utilize the transmitters 454TX to transmit the first uplink burst within a subframe on the TDD carrier. The first uplink burst is combined with a second uplink burst from a coupled mode subordinate entity on the TDD carrier utilizing non-orthogonal multiple access. For example, the second uplink burst may be the PUCCH 706 (FIG. 7) of coupled mode users, and the first uplink burst may be the PUCCH 708 and/or PUSCH 710 (FIG. 7) of decoupled mode users.

Figure 17:
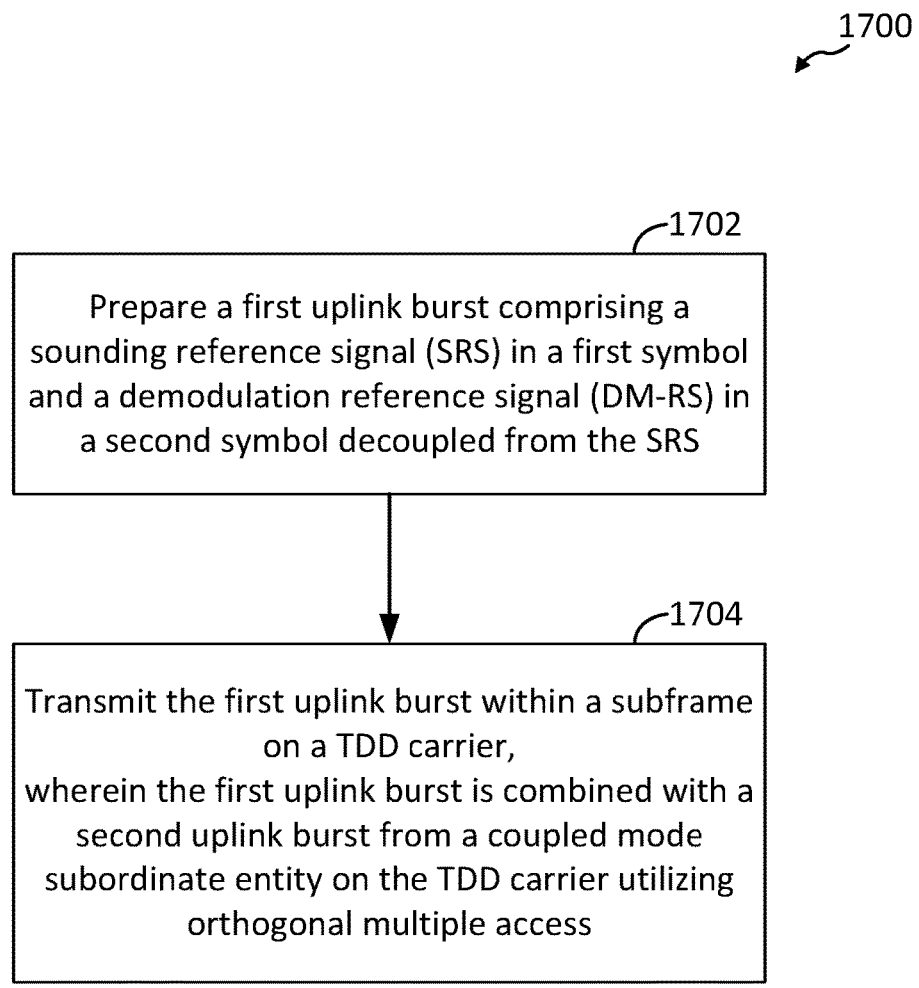
FIG. 17 is a flowchart illustrating an orthogonal multiple access method operable at a decoupled mode subordinate entity for wireless communication over a TDD carrier in accordance with an aspect of the disclosure.

FIG. 17 is a flowchart illustrating an orthogonal multiple access method 1700 operable at a decoupled mode subordinate entity for wireless communication over a TDD carrier in accordance with an aspect of the disclosure. For example, this method may be performed by any subordinate entity, e.g., as illustrated in FIGS. 1-4 in a common UL burst over a TDD carrier.

At block 1702, a subordinate entity prepares a first uplink burst including a sounding reference signal (SRS) in a first symbol and a demodulation reference signal (DM-RS) in a second symbol decoupled from the SRS. For example, a subordinate entity 204 (see FIG. 4) may utilize one or more of a TX processor 468, a channel estimator, and/or a data source 467 to prepare a first uplink burst 800 (see FIG. 8). At block 1704, the subordinate entity may utilize the transmitters 454TX to transmit the first uplink burst within a subframe on the TDD carrier. The first uplink burst is combined with a second uplink burst from a coupled mode subordinate entity on the TDD carrier utilizing orthogonal multiple access. For example, the second uplink burst may be the PUCCH 806 (FIG. 8) of coupled mode users, and the first uplink burst may be the PUCCH/PUSCH 808 (FIG. 8) of decoupled mode users.

In the above-described processes and procedures in relation to FIGS. 10-17, the uplink common burst may occur in both the downlink-centric subframes and uplink-centric subframes.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As those skilled in the art will readily appreciate, various aspects described throughout this disclosure may be extended to any suitable telecommunication system or systems, network architectures, and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), LTE-U, CDMA2000, Evolution-Data Optimized (EV-DO), Ultra Mobile Broadband (UMB), IEEE 802.11 (Wi-Fi), IEEE 802.16 (WiMAX), IEEE 802.20, Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method operable at a scheduling entity for wireless communication over a time division duplex (TDD) carrier, the method comprising:

receiving a first uplink burst from a coupled mode user within each of a downlink-centric subframe and an uplink-centric subframe of a frame on the TDD carrier, wherein the first uplink burst of the coupled mode user comprises a sounding reference signal (SRS) and data configured to be demodulated using the SRS as a demodulation reference signal (DM-RS); and receiving, simultaneously with the first uplink burst, a second uplink burst from a decoupled mode user within each of the downlink-centric subframe and the uplink-centric subframe of the frame on the TDD carrier, wherein the second uplink burst of the decoupled mode user comprises separate SRS and DM-RS; and differentiating the first uplink burst from the coupled mode user from the second uplink burst from the decoupled mode user on the TDD carrier, utilizing non-orthogonal multiple access.

2. The method of claim 1, wherein the differentiating comprises:

storing the received first uplink burst and second uplink burst in memory;

decoding the second uplink burst from the decoupled mode user;

applying interference cancellation to remove the second uplink burst from the stored received bursts; and decoding the first uplink burst from the coupled mode user from the interference cancelled received uplink bursts.

3. The method of claim 1, further comprising:

transmitting a control message to at least one of the decoupled mode user or the coupled mode user, the control message configured to control a contribution of the first uplink burst and/or the second uplink burst to a rise over thermal (RoT) detected by the scheduling entity such that the detected RoT does not exceed a predetermined threshold.

4. The method of claim 3, wherein the control message comprises an indication of a modulation and coding scheme (MCS) to be utilized by the decoupled mode user.

5. The method of claim 3, wherein the control message comprises a power control command for setting a power of the second uplink burst from the decoupled mode user.

6. The method of claim 3, wherein the control message comprises a power control command for setting a power of the first uplink burst from the coupled mode user.

7. A method operable at a scheduling entity for wireless communication over a time division duplex (TDD) carrier, the method comprising:

receiving a first uplink burst from a coupled mode user within each of a downlink-centric subframe and an uplink-centric subframe of a frame on the TDD carrier, wherein the first uplink burst of the coupled mode user comprises a sounding reference signal (SRS) and data configured to be demodulated using the SRS as a demodulation reference signal (DM-RS); and receiving, simultaneously with the first uplink burst, a second uplink burst from a decoupled mode user within each of the downlink-centric subframe and the uplink-centric subframe of the frame on the TDD carrier, wherein the second uplink burst of the decoupled mode user comprises separate SRS and DM-RS; and differentiating the first uplink burst from the coupled mode user from the second uplink burst from the decoupled mode user on the TDD carrier, utilizing orthogonal multiple access.

8. The method of claim 7, wherein the first uplink burst from the coupled mode user comprises at least one symbol comprising uplink control information, the uplink control information being structured as a single carrier waveform using interleaved frequency division multiple access (IFDMA) occupying a subset of subcarriers across resource blocks in the TDD carrier.

9. The method of claim 8, wherein the second uplink burst from the decoupled mode user comprises at least one symbol comprising uplink control information, the uplink control information being structured as an orthogonal frequency division multiplexed (OFDM) waveform interleaved between at least a portion of the subcarriers making up the uplink control information corresponding to the first uplink burst from the coupled mode user.

10. A scheduling entity configured for wireless communication over a time division duplex (TDD) carrier, the scheduling entity comprising:

a processor;

a memory communicatively coupled to the processor; and a transceiver communicatively coupled to the processor, wherein the processor and the memory are configured to:

receive a first uplink burst from a coupled mode user within each of a downlink-centric subframe and an uplink-centric subframe of a frame on the TDD carrier, wherein the first uplink burst of the coupled mode user comprises a sounding reference signal (SRS) and data configured to be demodulated using the SRS as a demodulation reference signal (DM-RS); and receive, simultaneously with the first uplink burst, a second uplink burst from a decoupled mode user within each of the downlink-centric subframe and the uplink-centric subframe of the frame on the TDD carrier, wherein the second uplink burst of the decoupled mode user comprises separate SRS and DM-RS; and differentiate the first uplink burst from the coupled mode user from the second uplink burst from the decoupled mode user on the TDD carrier, utilizing non-orthogonal multiple access.

11. The scheduling entity of claim 10, wherein the processor and the memory are further configured to:

store the received first uplink burst and second uplink burst in the memory;

decode the second uplink burst from the decoupled mode user;

apply interference cancellation to remove the second uplink burst from the stored received bursts; and decode the first uplink burst from the coupled mode user from the interference cancelled received uplink bursts.

12. The scheduling entity of claim 10, wherein the processor and the memory are further configured to:

transmit a control message to at least one of the decoupled mode user or the coupled mode user, the control message configured to control a contribution of the first uplink burst and/or the second uplink burst to a rise over thermal (RoT) detected by the scheduling entity such that the detected RoT does not exceed a predetermined threshold.

13. The scheduling entity of claim 12, wherein the control message comprises an indication of a modulation and coding scheme (MCS) to be utilized by the decoupled mode user.

14. The scheduling entity of claim 12, wherein the control message comprises a power control command for setting a power of the second uplink burst from the decoupled mode user.

15. The scheduling entity of claim 12, wherein the control message comprises a power control command for setting a power of the first uplink burst from the coupled mode user.

16. A scheduling entity configured for wireless communication over a time division duplex (TDD) carrier, the scheduling entity comprising:

a processor;

a memory communicatively coupled to the processor; and a transceiver communicatively coupled to the processor, wherein the processor and the memory are configured to:

receive a first uplink burst from a coupled mode user within each of a downlink-centric subframe and an uplink-centric subframe of a frame on the TDD carrier, wherein the first uplink burst of the coupled mode user comprises a sounding reference signal (SRS) and data configured to be demodulated using the SRS as a demodulation reference signal (DM-RS); and receive, simultaneously with the first uplink burst, a second uplink burst from a decoupled mode user within each of the downlink-centric subframe and the uplink-centric subframe of the frame on the TDD carrier, wherein the second uplink burst of the decoupled mode user comprises separate SRS and DM-RS; and differentiate the first uplink burst from the coupled mode user from the second uplink burst from the decoupled mode user on the TDD carrier, utilizing orthogonal multiple access.

17. The scheduling entity of claim 16, wherein the first uplink burst from the coupled mode user comprises at least one symbol comprising uplink control information, the uplink control information being structured as a single carrier waveform using interleaved frequency division multiple access (IFDMA) occupying a subset of subcarriers across resource blocks in the TDD carrier.

18. The scheduling entity of claim 17, wherein the second uplink burst from the decoupled mode user comprises at least one symbol comprising uplink control information, the uplink control information being structured as an orthogonal frequency division multiplexed (OFDM) waveform interleaved between at least a portion of the subcarriers making up the uplink control information corresponding to the first uplink burst from the coupled mode user.

* * * * *